United States Patent [19]

Ohkado

[11] Patent Number: 5,760,883
[45] Date of Patent: Jun. 2, 1998

[54] MULTIPLE POINTS DISTANCE MEASURING APPARATUS

[75] Inventor: Teruyuki Ohkado, Tokyo, Japan

[73] Assignee: Canon Kabushiki Kaisha, Tokyo, Japan

[21] Appl. No.: 598,227

[22] Filed: Feb. 7, 1996

[30] Foreign Application Priority Data

Feb. 8, 1995 [JP] Japan .................. 7-042594

[51] Int. Cl.$^6$ .................. G01C 3/00; G03B 13/00
[52] U.S. Cl. .................. 356/3.01; 356/3.02; 356/3.03
[58] Field of Search .................. 356/3.01, 3.02, 356/3.03, 3.06, 3.07, 3.1, 3.11; 396/109

[56] References Cited

U.S. PATENT DOCUMENTS

| | | |
|---|---|---|
| 4,748,469 | 5/1988 | Tamura . |
| 5,229,806 | 7/1993 | Takehana . |
| 5,274,429 | 12/1993 | Misawa et al. .................. 356/1 |
| 5,313,245 | 5/1994 | Konishi . |
| 5,550,628 | 8/1996 | Kawabata .................. 356/3.11 |

*Primary Examiner*—Stephen C. Buczinski
*Attorney, Agent, or Firm*—Fitzpatrick, Cella, Harper & Scinto

[57] ABSTRACT

An apparatus for obtaining information associated with distances in a plurality of target directions by projecting light in the plurality of target directions and receiving the reflected light, includes a first light emitting portion, a second light emitting portion, and a division light projecting device for division-projecting light emitted by the first light emitting portion in at least first and second target directions, and division-projecting light emitted by the second light emitting portion in at least the second target direction and a third target direction.

30 Claims, 17 Drawing Sheets

$\left(y = x - \dfrac{a+b}{2}\right)$ $(y = x)$

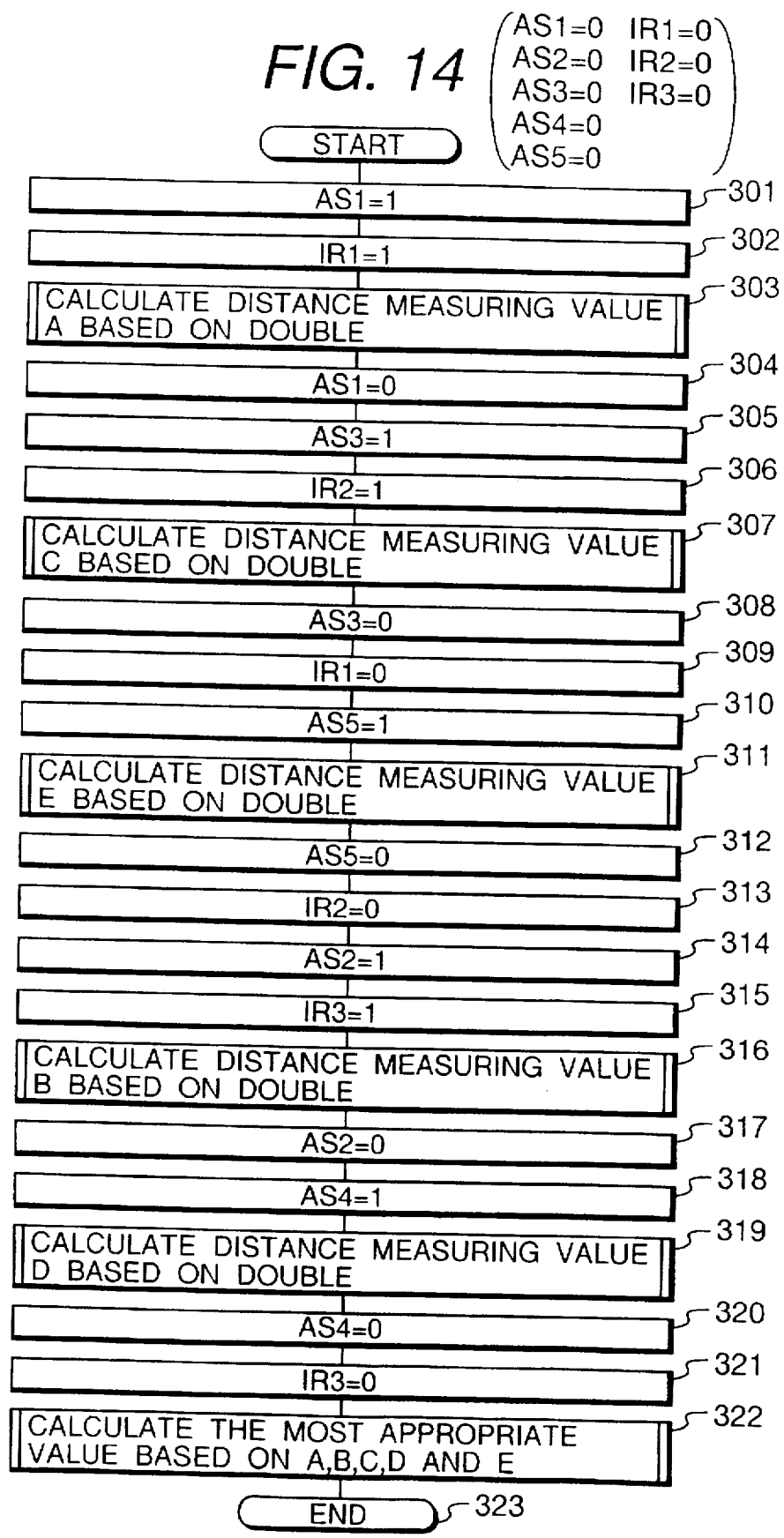

MULTIPLE POINTS DISTANCE MEASURING APPARATUS

BACKGROUND OF THE INVENTION

1. Field of the Invention

The present invention relates to an improvement in a multiple points distance measuring apparatus for measuring the distances to an object in a plurality of target directions.

2. Description of the Related Art

As is widely known, in a conventional multiple points distance measuring apparatus having light emitting means, when an optical member is disposed in front of the light emitting means, the projection point can be enlarged with a single light emitting means (light projecting element) (e.g., U.S. Pat. No. 5,274,429).

An active type multiple points distance measuring apparatus, which enlarges the projection point by disposing an optical member in front of the light emitting means with a single light emitting means, will be described below with reference to FIGS. 18 to 20.

FIG. 18 is a schematic view showing the arrangement of a multiple points distance measuring apparatus of this type. Referring to FIG. 18, an IRED (infrared light emitting diode) 841 serves as the light emitting means. Light projecting lenses 861, 862, and 863 focus and divide light emitted by the IRED 841. Assume that these lenses have a focal length f, and the optical axis intervals between the adjacent lenses are kept to have distances $x_1$ and $x_2$. Projected optical images 881, 882, and 883 are projected from the IRED 841 via the light projecting lenses 861, 862, and 863, and are formed at positions separated by a distance D from these lenses.

As shown in FIG. 18, light emitted by the IRED 841 as a single light emitting means is divided into three beams by the light projecting lenses 861, 862, and 863, and the projected optical images 881, 882, and 883 are formed on an object to be measured.

A light-receiving lens 864 receives light beams projected onto and reflected by the object to be measured. The lens 864 has a focal length $f_{j1}$, and the intervals (base lengths) between the light projecting lenses 861, 862, and 863, and the light-receiving lens 864 are respectively $Ka_1$, $Kb_1$, and $Kc_1$. PSDs (semiconductor position detectors) 815, 816, and 817 serve as light-receiving sensors for receiving light incident via the light-receiving lens 864, and photoelectrically converting the received light. These PSDs have a layout so that the PSD 815 receives the reflected light of the projected optical image 883, the PSD 816 receives the reflected light of the projected optical image 882, and the PSD 817 receives the reflected light of the projected optical image 881.

FIG. 19 is a block diagram showing the circuit arrangement of the above-mentioned multiple points distance measuring apparatus, and the same reference numerals in FIG. 19 denote the same parts as in FIG. 18.

Referring to FIG. 19, amplifiers 821 and 822 convert the output current from the PSD 815 into voltages, amplifiers 823 and 824 convert the output current from the PSD 816 into voltages, and amplifiers 825 and 826 convert the output current from the PSD 817 into voltages. Analog switches 861, 862, 863, 864, 865, and 866 are used for switching the outputs from the amplifiers 821 to 824, and are controlled by control signals AS1, AS2, and AS3 from a CPU 851 (to be described later). Each analog switch is turned off when the control signal is "0"; it is turned on when the control signal is "1". Amplifiers 831 and 832 respectively multiply the current-voltage conversion amplifiers, selected by the analog switches 861 and 863, 862 and 864, or 865 and 866, with α. A calculation circuit 841 calculates distance, and comprises a known double integral circuit for outputting a result proportional to the reciprocal of the distance on the basis of the outputs from the amplifiers 831 and 832. The CPU 851 controls the respective units, and calculates distance. An IRED driving circuit 852 drives the IRED 841, and is controlled by a control signal IR1 from the above-mentioned CPU 851. When the output from the circuit is "0", the IRED 841 is set in the non-projecting state; when the output is "1", the IRED 841 is set in the projecting state.

The distance measuring operation of the multiple points distance measuring apparatus with the above-mentioned arrangement will be described below with reference to the flow chart shown in FIG. 20.

In the initial state, assume that the control signals AS1, AS2, AS3, and IR1 output from the CPU 851 are respectively "0" (AS1=AS2=AS3=IR1=0).

In step 901, AS1=1 is set to select the PSD 815. In step 902, IR1=1 is set to drive the IRED 841. In step 903, distance measurement is performed by a known double integral operation (not shown) using the projected optical image 883, and the distance measuring value obtained by this operation is set in A.

In step 904, AS1=0 is set. Subsequently, in step 905, AS2=1 is set to switch the PSD from the PSD 815 to the PSD 816. In step 906, a distance measurement is performed by a known double integral operation (not shown) using the projected optical image 882, and the distance measuring value obtained by this operation is set in B. In step 907, AS2=0 is set. Subsequently, in step 908, AS3=1 is set to switch the PSD from the PSD 816 to the PSD 817. In step 909, a distance measurement is performed by a known double integral operation (not shown) using the projected optical image 881, and the distance measuring value obtained by this operation is set in C. In step 910, AS3=0 is set. In step 911, IR1=0 is set to stop the driving operation of the IRED 841.

In step 912, the most appropriate value is calculated based on the above-mentioned distance measuring values A, B, and C. In step 913, the series of distance measuring operations end.

Like in the prior art, when light emitted by a single light emitting means (IRED 841) is divided by a plurality of optical members (the light projecting lenses 861, 862, and 863) (when the number of projection points is to be increased), each optical member must have a small size due to a limitation on the spaces for the respective units. For example, when other members are arranged around the light emitting means, and only a limited space can be assured for the optical members, if a plurality of (two or more) light projecting lenses are used as optical members like in the prior art, the effective aperture size of each lens must be decreased as the number of light projecting lenses increases. If only the effective aperture size is decreased while the focal length of each light projecting lens remains the same, the f-number of each lens increases, and as a result, the luminance of each divided projected optical image falls, thus lowering the S/N ratio of the multiple points distance measuring apparatus.

More specifically, in the prior art, when the projection point is enlarged by a single light emitting means (when the number of distance measuring points is increased), the number of light projecting lenses must be increased, and the S/N ratio of the multiple points distance measuring apparatus falls as the number of projection points increases.

In the prior art, the number of distance measuring points is increased by division-projecting light emitted by a single light emitting means (IRED 841) using a plurality of optical members (light projecting lenses 861, 862, and 863). For this reason, light cannot be projected onto only one of the plurality of (three, in this case) distance measuring points. More specifically, as can be seen from FIG. 18, when the object to be measured moves from a far-distance position to a near-distance position, light from a projected optical image to be originally measured may interfere with that of a projected optical image which does not correspond to the current light-receiving sensor, on the light-receiving sensor (for example, although the PSD 816 is to perform a distance measurement based on the projected optical image 882, the projected optical image 881 undesirably falls within the range of the PSD 816 at the near-distance position, resulting in a distance measurement error). For this reason, the shapes and layout of the sensors must be determined in consideration of the sensor layout, the distances between adjacent ones of the light projecting lenses 861, 862, and 863, and the size of light emission of the IRED 841, so as to prevent interference among the projected optical images.

SUMMARY OF THE INVENTION

One aspect of the present invention is to attain both an increase in the number of target directions and an improvement in precision by providing an apparatus for obtaining information associated with distances in a plurality of target directions by projecting light in the plurality of target directions and receiving reflected light, comprising a first light emitting portion, a second light emitting portion, and a division light projecting device for division-projecting light emitted by the first light emitting portion in at least first and second target directions, and division-projecting light emitted by the second light emitting portion in at least the second target direction and a third target direction.

Other aspects of the present invention will become apparent from the following description of the preferred embodiments.

BRIEF DESCRIPTION OF THE DRAWINGS

FIG. 14 is a flow chart showing the operation of the distance measuring apparatus shown in FIG. 13;

DETAILED DESCRIPTION OF THE PREFERRED EMBODIMENTS

The preferred embodiments of the present invention will be described below with reference to the accompanying drawings.

Figure 1:
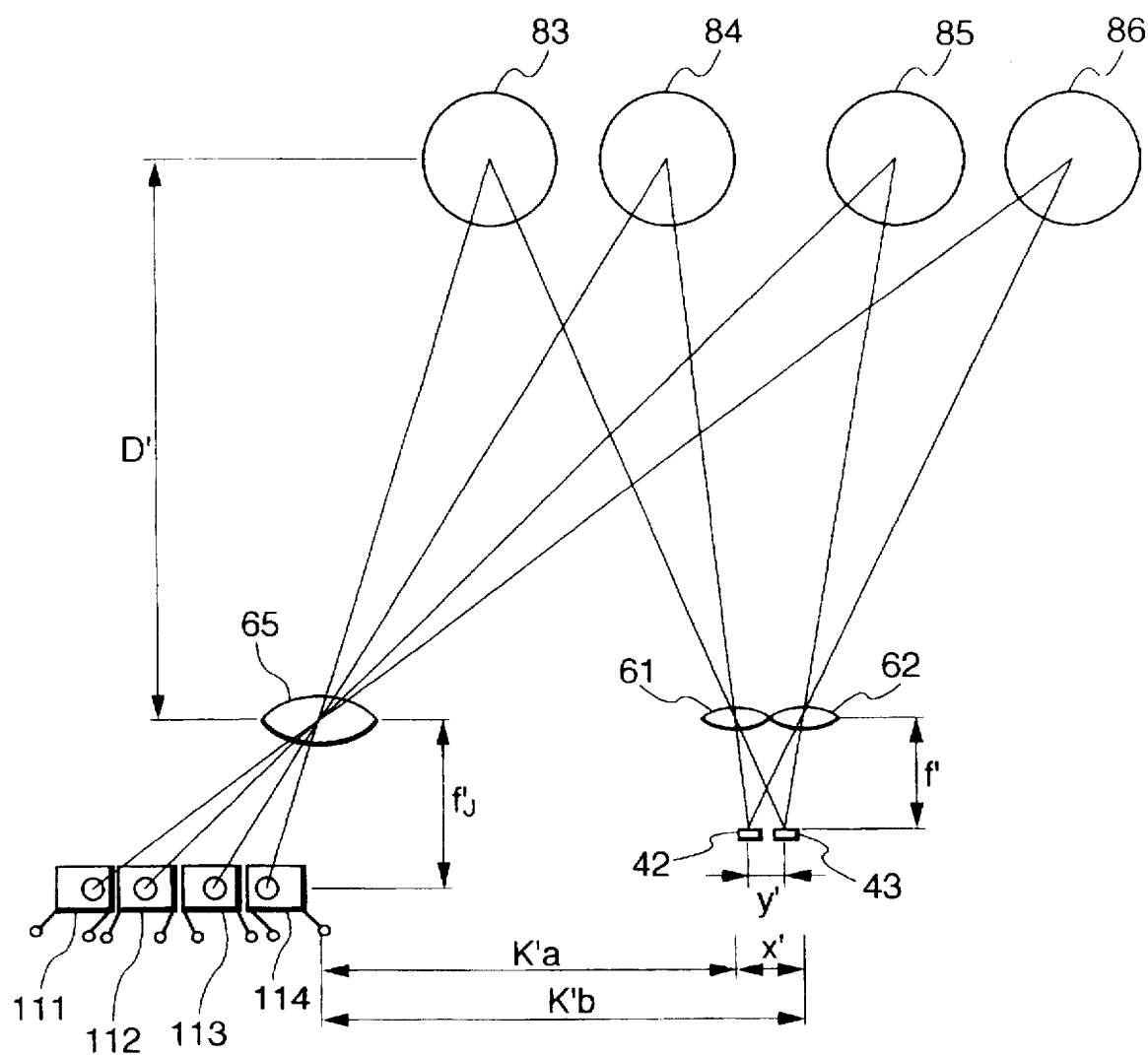
FIG. 1 is a schematic view showing the arrangement of a light projecting/receiving system of a distance measuring apparatus according to the first embodiment of the present invention.
Figure 2:
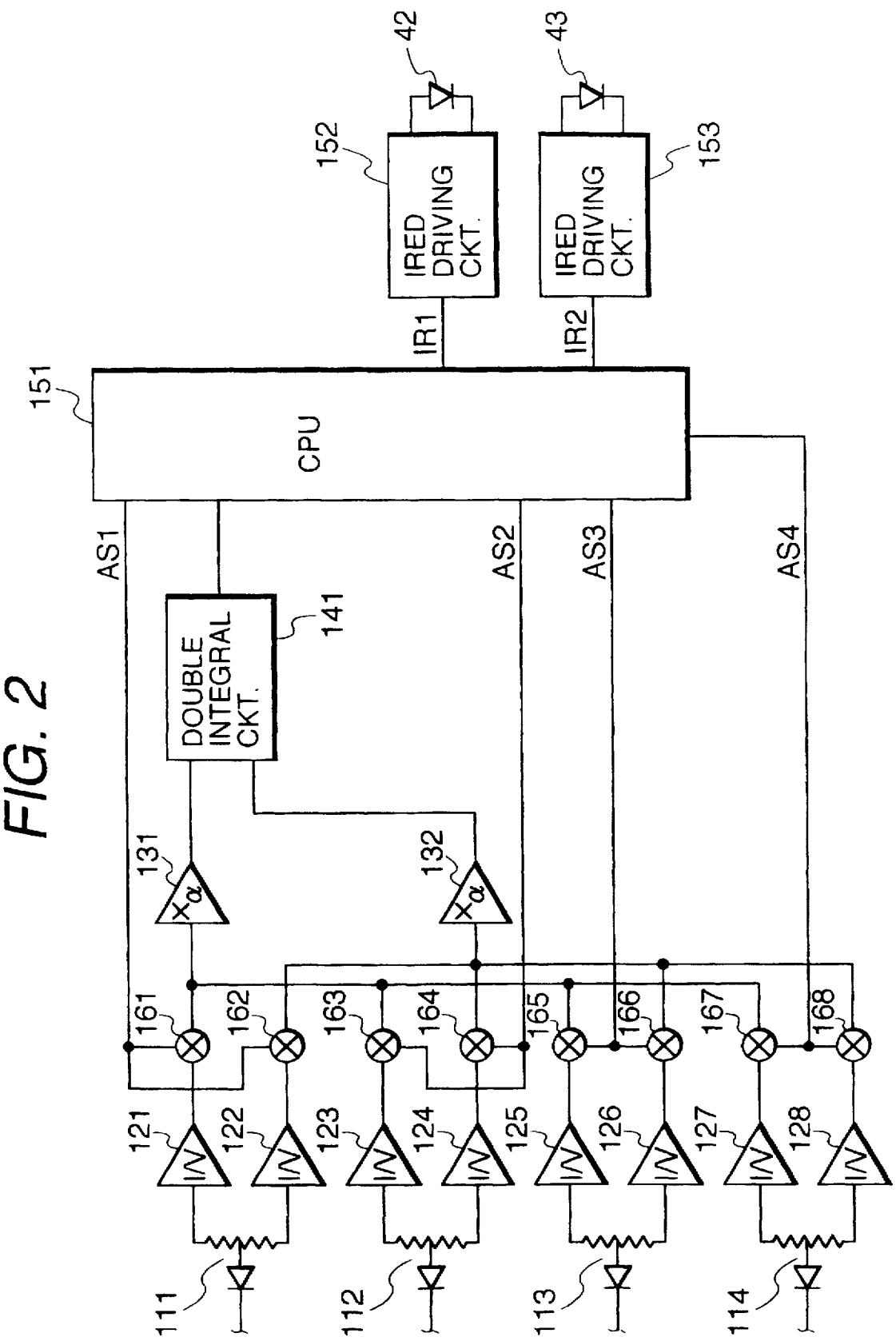
FIG. 2 is a block diagram showing the circuit arrangement of the distance measuring apparatus according to the first embodiment of the present invention.
Figure 3:
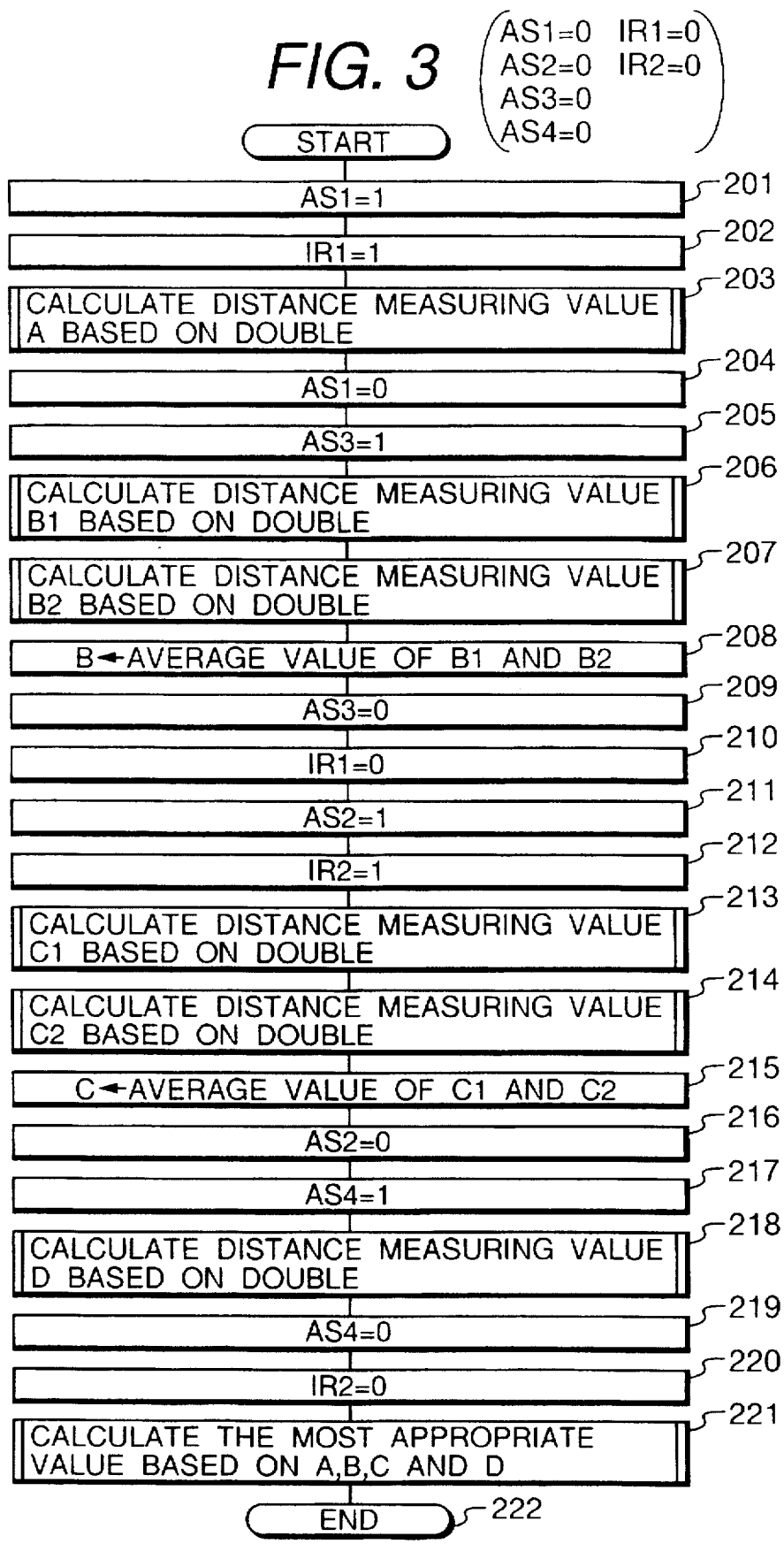
FIG. 3 is a flow chart showing the operation of the distance measuring apparatus shown in FIG. 2.

FIGS. 1 to 3 show the first embodiment of the present invention. In particular, FIG. 1 is a schematic view showing the arrangement of a light projecting/receiving system of a multiple points distance measuring apparatus.

Referring to FIG. 1, an IRED 42 serves as first light emitting means, and an IRED 43 serves as second light emitting means. The distances between the centers of these IREDs (i.e., the interval of the centers of light emitting portions) is kept to be y'. Light projecting lenses 61 and 62 focus and divide light beams emitted by the IREDs 42 and 43. Assume that these lenses have a focal length f and an interval x' of the lens principal point positions. Projected optical images 83, 84, 85, and 86 are projected from the IREDs 42 and 43 via the light projecting lenses 61 and 62, and are formed at positions separated by a distance D' from these lenses.

As shown in FIG. 1, light beams emitted by the IREDs 42 and 43 as the two light emitting means are divided into four light beams by the light projecting lenses 61 and 62, so that the projected optical images 84 and 86 are formed by the IRED 42, and the projected optical images 83 and 85 are formed by the IRED 43. More specifically, the projected optical image 85 formed by the IRED 43 is projected between the projected optical images 84 and 86 formed by the IRED 42, and the projected optical image 84 formed by the IRED 42 is projected between the projected optical images 83 and 85 formed by the IRED 43.

A light-receiving lens 65 focuses light beams projected onto and reflected by an object to be measured. The lens 65 has a focal length $f_j'$, and intervals (base lengths) Ka' and Kb' between itself and the light projecting lenses 61 and 62. PSDs 111, 112, 113, and 114 serve as light-receiving means which receive reflected light beams incident via the light-receiving lens 65 and photoelectrically convert the received light beams. These PSDs have a layout so that the PSD 111 receives the reflected light of the projected optical image 86, the PSD 112 receives the reflected light of the projected optical image 85, the PSD 113 receives the reflected light of the projected optical image 84, and the PSD 114 receives the reflected light of the projected optical image 83. In FIG. 1, the projected optical images 84 and 85 correspond to substantially the central portions of the projection points.

FIG. 2 is a block diagram showing the circuit arrangement of the multiple points distance measuring apparatus with the above-mentioned light projecting/receiving system, and the same reference numerals in FIG. 2 denote the same parts as in FIG. 1.

Referring to FIG. 2, amplifiers 121 and 122 convert the output current from the PSD 111 into voltages, amplifiers 123 and 124 convert the output current from the PSD 112 into voltages, amplifiers 125 and 126 convert the output current from the PSD 113 into voltages, and amplifiers 127 and 128 convert the output current from the PSD 114 into voltages. Analog switches 161, 162, 163, 164, 165, 166, 167, and 168 are used for switching the outputs from the amplifiers 121 to 128, and are controlled by control signals AS1, AS2, AS3, and AS4 from a CPU 151 (to be described later). Each switch is turned off when the control signal is "0"; the switch is turned on when the control signal is "1".

Amplifiers 131 and 132 respectively multiply the outputs from the current-voltage conversion amplifiers 121 to 128 selected by the analog switches 161 to 168 with α. A calculation circuit 141 calculates distance, and comprises a known double integral circuit for outputting a result proportional to the reciprocal of the distance on the basis of the outputs from the amplifiers 131 and 132. The CPU (microcomputer) 151 controls the respective units, and calculates distance. IRED driving circuits 152 and 153 are used for driving the IREDs 42 and 43, and are controlled by control signals IR1 and IR2 from the above-mentioned CPU 151. When the output from the circuit is "0", each IRED is set in the non-projecting state; when the output is "1", each IRED is set in the projecting state.

The distance measuring operation of the multiple points distance measuring apparatus with the above arrangement will be described below with reference to the flow chart of the CPU 151 shown in FIG. 3.

In the initial state, assume that the control signals AS1, AS2, AS3, AS4, IR1, and IR2 from the CPU 151 are respectively "0" (AS1=AS2=AS3=AS4=IR1=IR2=0).

In step 201, AS1=1 is set to select the PSD 111. In step 202, IR1=1 is set to drive the IRED 42. In step 203, a distance measurement is performed by a known double integral operation (not shown) using the projected optical image 86, and the distance measuring value obtained by this operation is set in A.

In step 204, AS1=0 is set. In step 205, AS3=1 is set to switch the PSD from the PSD 111 to the PSD 113. In step 206, a distance measurement is performed by a known double integral operation (not shown) using the projected optical image 84, and the distance measuring value obtained by this operation is set in B1. Furthermore, in step 207, a distance measurement is performed by a known double integral operation (not shown) using the projected optical image 84 again, and the distance measuring value obtained by this operation is set in B2. In step 208, the average value (the present invention is not limited to this, as a matter of course) of the distance measuring values B1 and B2 is calculated and is set in B.

In step 209, AS3=0 is set. In step 210, IR1=0 is set to stop the driving operation of the IRED 42. In step 211, AS2=1 is set to select the PSD 112. In step 212, IR2=1 is set to drive the IRED 43. In step 213, a distance measurement is performed by a known double integral operation (not shown) using the projected optical image 85, and the distance measuring value obtained by this operation is set in C1. Furthermore, in step 214 as well, a distance measurement is performed by a known double integral operation (not shown) using the projected optical image 85 again, and the distance measuring value obtained by this operation is set in C2. In step 215, the average value of the distance measuring values C1 and C2 is calculated, and is set in C.

In step 216, AS2=0 is set. In step 217, AS4=1 is set to switch the PSD from the PSD 112 to the PSD 114. In step 218, a distance measurement is performed by a known double integral operation (not shown) using the projected optical image 83, and the distance measuring value obtained by this operation is set in D.

In step 219, AS4=0 is set. In step 220, IR2=0 is set to stop the driving operation of the IRED 43. In step 221, the most appropriate value (e.g., the focusing adjustment position of an imaging optical system) is calculated based on the above-mentioned distance measuring values A, B, C, and D. In step 222, the series of distance measuring operations end.

According to the first embodiment, adjacent ones of the projected optical images 83 to 86 are those formed by different light emitting means, and can be independently driven (controlled). For this reason, upon execution of a distance measurement using one light emitting means, the other light emitting means is stopped to prevent the above-mentioned interference.

Since two distance measuring operations are performed for each of the projected optical images 84 and 85, and the distance measuring values are averaged to determine corresponding distance measuring values, the S/N ratios of substantially the central portions of the projection points which are important in, e.g., a camera, can be greatly improved in practice.

In this case, the distance measuring operation is performed twice for each projected optical image. However, the number of distance measuring operations is not particularly limited as long as the distance measuring operation is performed a plurality of number of times.

Figure 4:
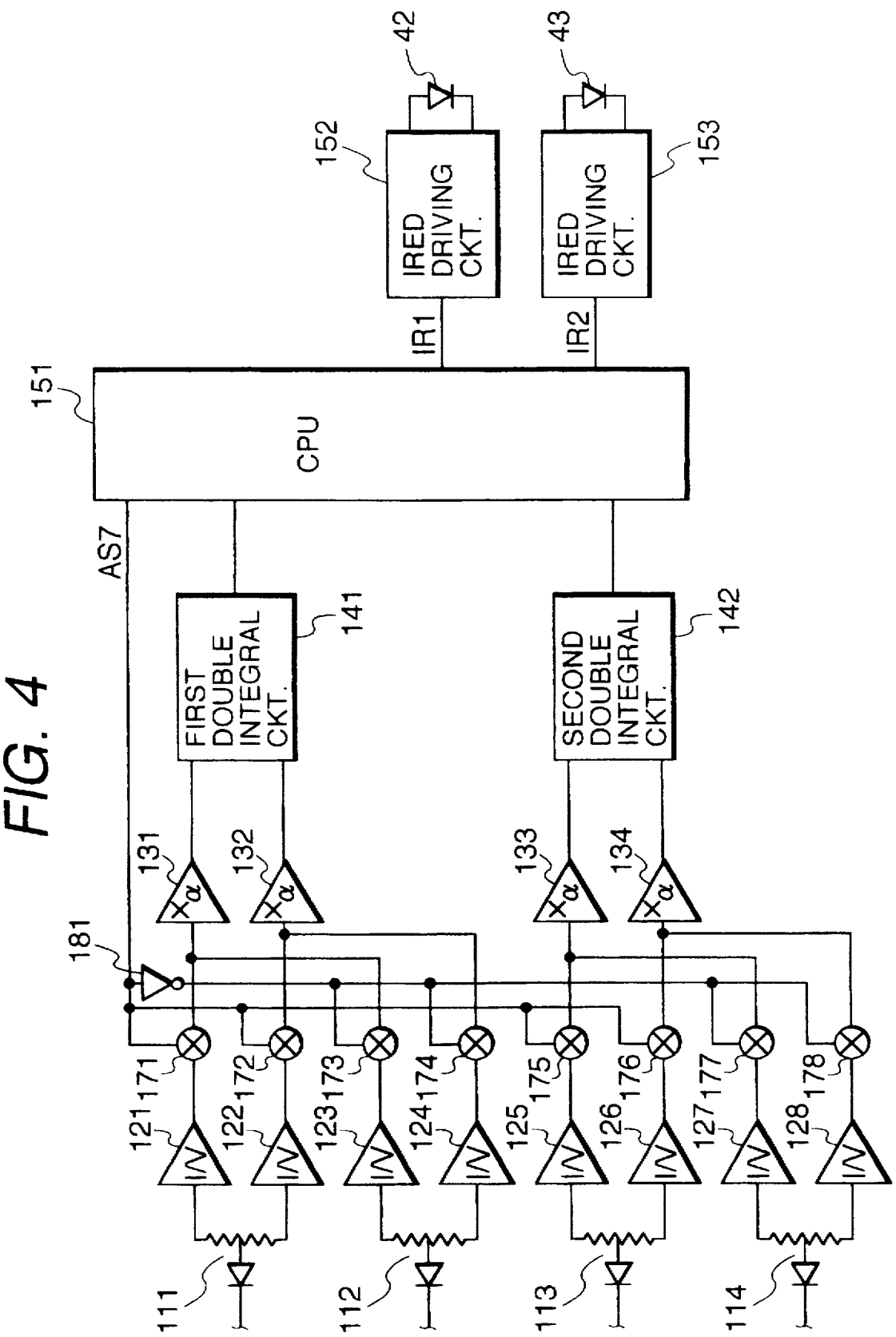
FIG. 4 is a block diagram showing the circuit arrangement of a distance measuring apparatus according to the second embodiment of the present invention.
Figure 5:
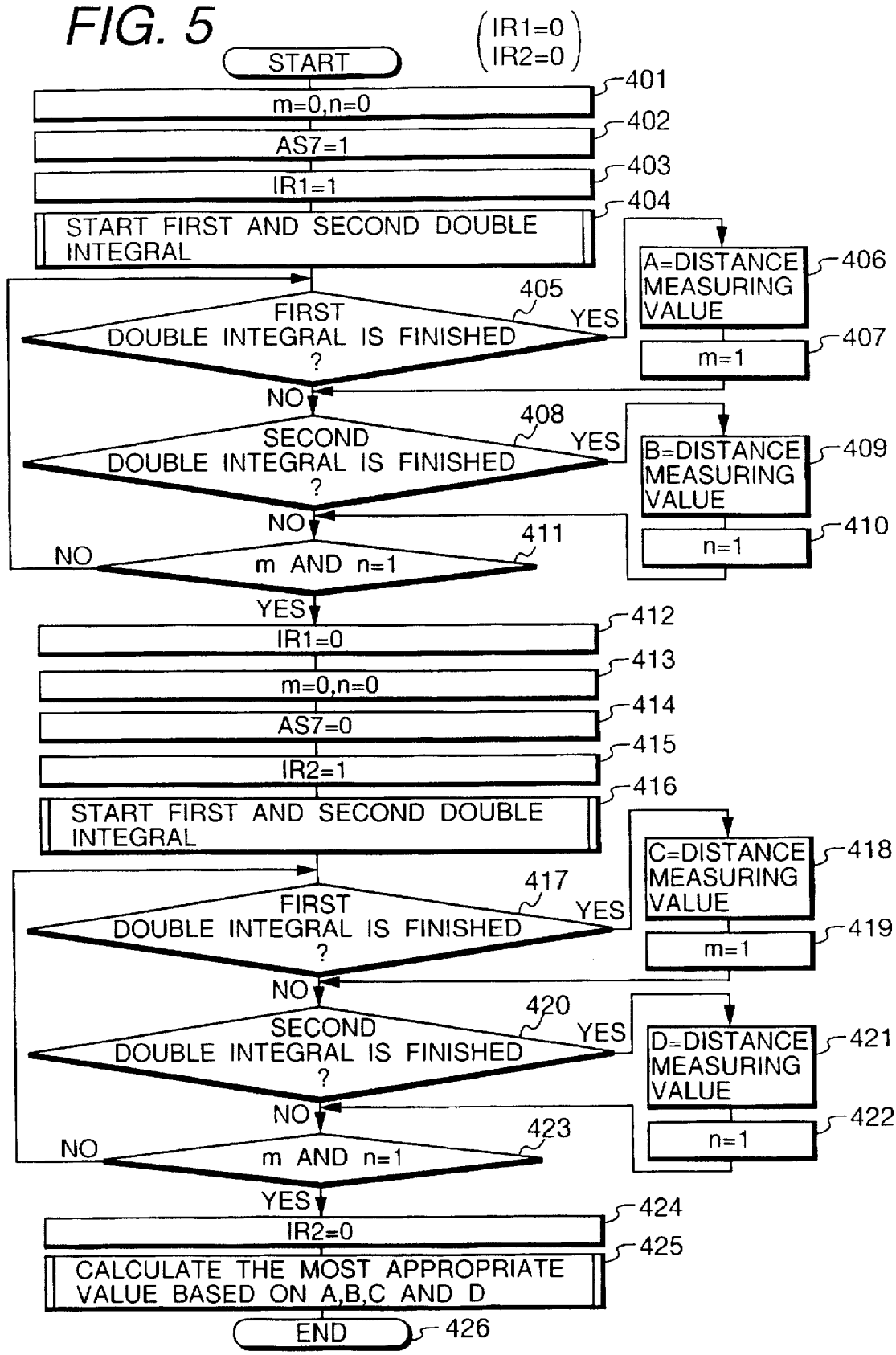
FIG. 5 is a flow chart showing the operation of the distance measuring apparatus shown in FIG. 4.

FIGS. 4 and 5 show the second embodiment of the present invention. Since the light projecting/receiving system of the multiple points distance measuring apparatus of this embodiment is the same as that in the first embodiment (see FIG. 1), a detailed description and illustration thereof will be omitted.

FIG. 4 is a block diagram showing the circuit arrangement of the multiple points distance measuring apparatus according to the second embodiment of the present invention, and the same reference numerals in FIG. 4 denote the same parts as in FIG. 1.

Referring to FIG. 4, amplifiers 121 and 122 convert the output current from a PSD 111 into voltages, amplifiers 123 and 124 convert the output current from a PSD 112 into voltages, amplifiers 125 and 126 convert the output current from a PSD 113 into voltages, and amplifiers 127 and 128 convert the output current from a PSD 114 into voltages. Analog switches 171, 172, 173, 174, 175, 176, 177, and 178 are used for switching the outputs from the amplifiers 121 to 128, and are controlled by a control signal AS7 from a CPU 151 (to be described later). Each analog switch is turned off when the control signal input thereto is "0"; the switch is turned on when the control signal is "1".

Amplifiers 131, 132, 133, and 134 respectively multiply the outputs from the current-voltage conversion amplifiers 121 to 128 selected by the analog switches 171 to 178 with α. A calculation circuit 141 calculates distance, and comprises as a known double integral circuit, serving as a first double integral circuit, for outputting a result proportional to the reciprocal of the distance on the basis of the outputs from the amplifiers 131 and 132. Also, a known double integral circuit 142 serves as a second double integral circuit, and outputs a result proportional to the reciprocal of the distance on the basis of the outputs from the amplifiers 133 and 134. The CPU 151 controls the respective units, and calculates distance. An inverter 181 inverts the control signal AS7 from the CPU 151. IRED driving circuits 152 and 153 are used for driving the IREDs 42 and 43, and are controlled by control signals IR1 and IR2 from the above-mentioned CPU 151. When the output from the circuit is "0", each IRED is set in a non-projecting state; when the output is "1", the IRED is set in a projecting state.

The distance measuring operation of the multiple points distance measuring apparatus with the above arrangement will be described below with reference to the flow chart of the CPU 151 shown in FIG. 5.

In the initial state, assume that the control signals IR1 and IR2 from the CPU 151 are respectively "0" (IR1=IR2=0).

In step 401, first and second double integral latches m and n serving as discrimination latches (to be described later) are respectively set to be "0". In step 402, AS7=1 is set, so that the signal from the PSD 111 is input to the first double integral circuit 141 via the amplifiers 131 and 132, and the signal from the PSD 113 is input to the second double integral circuit 142 via the amplifiers 133 and 134.

In step 403, IR1=1 is set to drive the IRED 42. In step 404, the double integral operations of the first and second double integral circuits 141 and 142 are simultaneously started. In step 405, it is checked if the first double integral operation (i.e., the distance measurement based on a projected optical image 86) is finished. If NO in step 405, the flow advances to step 408. On the other hand, if YES in step 405, the flow advances to step 406, and the distance measuring value obtained by the first double integral operation is set in A. Subsequently, in step 407, the first double integral finish latch m is set to be "1", and thereafter, the flow advances to step 408.

In step 408, it is checked if the second double integral operation (i.e., the distance measurement based on a projected optical image 84) is finished. If NO in step 408, the flow advances to step 411. On the other hand, if YES in step 408, the flow advances to step 409, and the distance measuring value obtained by the second double integral operation is set in B. Subsequently, in step 410, the second double integral finish latch n is set to be "1", and the flow advances to step 411.

In step 411, it is checked if both the first and second double integral operations are finished. If YES in step 411, the flow advances to step 412, and the IR1=0 is set to stop the driving operation of the IRED 42. On the other hand, if NO in step 411, the flow returns to step 405, and the operations in steps 405 to 411 are repeated.

In step 413, the latches m and n serving as discrimination latches are respectively set to be "0". In step 414, AS7=0 is set, so that the signal from the PSD 112 is input to the first double integral circuit 141 via the amplifiers 131 and 132, and the signal from the PSD 114 is input to the second double integral circuit 142 via the amplifiers 133 and 134.

In step 415, IR2=1 is set to drive the IRED 43. In step 416, the double integral operations of the first and second double integral circuits 141 and 142 are simultaneously started. In step 417, it is checked if the first double integral operation (i.e., the distance measurement based on a projected optical image 85) is finished. If NO in step 417, the flow advances to step 420. On the other hand, if YES in step 417, the flow advances to step 418, and the distance measuring value obtained by the first double integral operation is set in C. Subsequently, in step 419, the first double integral finish latch m is set to be "1", and the flow then advances to step 420.

In step 420, it is checked if the second double integral operation (i.e., the distance measurement based on a projected optical image 83) is finished. If NO in step 420, the flow advances to step 423. On the other hand, if YES in step 420, the flow advances to step 421, and the distance measuring value obtained by the second double integral operation is set in D. Subsequently, in step 422, the second double integral finish latch n is set to be "1", and the flow advances to step 423. In step 423, it is checked if both the first and second double integral operations are finished. If NO in step 423, the flow returns to step 417, and the operations in steps 417 to 423 are repeated. On the other hand, if it is determined in step 423 that both the integral operations are finished, the flow advances to step 424, and IR2=0 is set to stop the driving operation of the IRED 43. In step 425, the most appropriate value is calculated based on the above-mentioned distance measuring values A, B, C, and D. In step 426, the series of distance measuring operations end.

According to the second embodiment, since reflected light beams division-projected by the single light emitting means are received by different light-receiving means, and distances are independently and simultaneously calculated by a plurality of calculation circuits, the distance measuring time can be remarkably shortened although multiple points distance measuring operations are performed.

Figure 6:
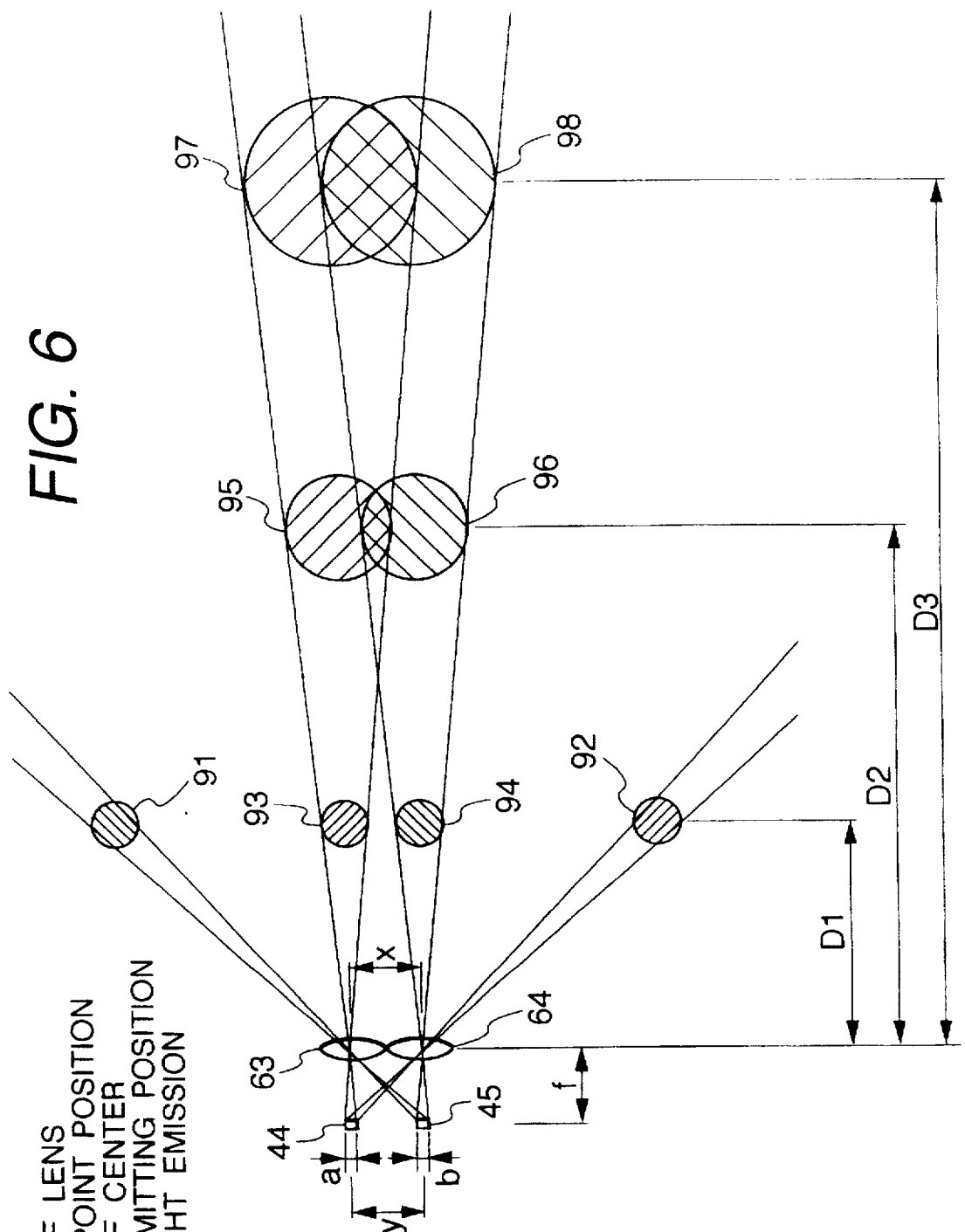
FIG. 6 is a schematic view showing the arrangement of a light projecting/receiving system of a distance measuring apparatus according to the third embodiment of the present invention.

FIG. 6 is a schematic view showing the arrangement of a light projecting/receiving system of a multiple points distance measuring apparatus according to the third embodiment of the present invention. In this embodiment, when light beams emitted by a small number of light emitting means are division-projected via a plurality of lenses or the like, the layout of the light emitting means is determined so that light beams projected from different light emitting means overlap each other at substantially the central portion of the divided projection points. In order to explain the layout in which light beams projected by different light emitting means overlap each other, assume that the number of light emitting means is two, a lens is used as an optical member to be disposed in front of the light emitting means, and the number of lenses is also two (a compound eye lens may be arranged or two single lenses may be juxtaposed).

Referring to FIG. 6, an IRED 44 serves as first light emitting means, and an IRED 45 serves as second light emitting means. Light projecting lenses 63 and 64 focus and divide light beams emitted by the light emitting means 44 and 45, and have a focal length f. The IREDs 44 and 45, and the light projecting lenses 63 and 64 constitute light projecting means.

Projected optical images 91, 92, 93, and 94 are projected from the IREDs 44 and 45 via the light projecting lenses 63 and 64 and are formed at positions separated by a distance D1 from these lenses. Also, projected optical images 95 and 96 are projected from the IREDs 44 and 45 via the light projecting lenses 63 and 64 and are formed at substantially the central portion at positions separated by a distance D2 from these lenses. Furthermore, projected optical images 97 and 98 are projected from the IREDs 44 and 45 via the light projecting lenses 63 and 64 and are formed at substantially the central portion at positions separated by a distance D3 from these lenses.

The intervals between the IREDs 44 and 45, and the light projecting lenses 63 and 64 are kept to be about f, and the interval of the lens principal point positions of the light projecting lenses 63 and 64 is kept to be x. Furthermore, the distance between the centers of the light emitting portions of the IREDs 44 and 45 is set to be y, and the substantial sizes of the light emitting portions in the alignment direction of the IREDs 44 and 45 are respectively set to be a and b.

Figure 7:
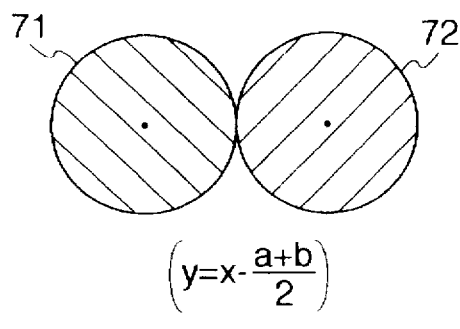
FIG. 7 is a view showing the state of projected optical images formed at the infinity position when different optical axis intervals are set between the IREDs and light projecting lenses in FIG. 6.

FIG. 7 shows projected optical images formed at substantially the central portion at an infinity distance position when the relationship between the interval x of the lens principal point positions and the substantial interval y of the centers of the light emitting portions in FIG. 6 is set to be:

$$y = x - (a+b)/2$$

In FIG. 7, a projected optical image 71 is formed by the IRED 44 and a projected optical image 72 is formed by the IRED 45.

Figure 8:
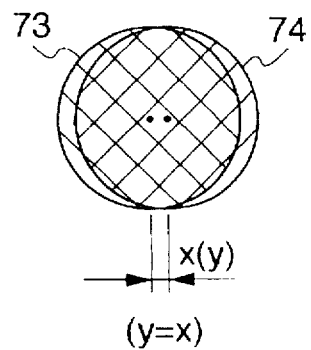
FIG. 8 is a view showing the state of projected optical images formed at the infinity position when equal optical axis intervals are set between the IREDs and light projecting lenses in FIG. 6.

FIG. 8 shows projected optical images formed at substantially the central portion at an infinity distance position when the relationship between the interval x of the lens principal point positions and the interval y of the centers of the light emitting portions in FIG. 6 is set to be:

$$y = x$$

In FIG. 8, a projected optical image 73 is formed by the IRED 44 and a projected optical image 74 is formed by the IRED 45.

From FIGS. 6 to 8, when the light emitting means and the lenses are disposed so that the relationship between the interval x of the lens principal point positions and the interval y of the centers of the light emitting portions satisfies a condition:

$$y \geq x - (a+b)/2 \quad (1)$$

projected images formed at substantially the central portion at a given finite distance of the divided projected light beams partially or entirely overlap each other. For this reason, by performing the distance measurement utilizing the overlapping portion, the S/N ratio of the multiple points distance measuring apparatus can be improved in practice.

An example of such arrangement will be described below with reference to FIGS. 9 to 11.

Figure 9:
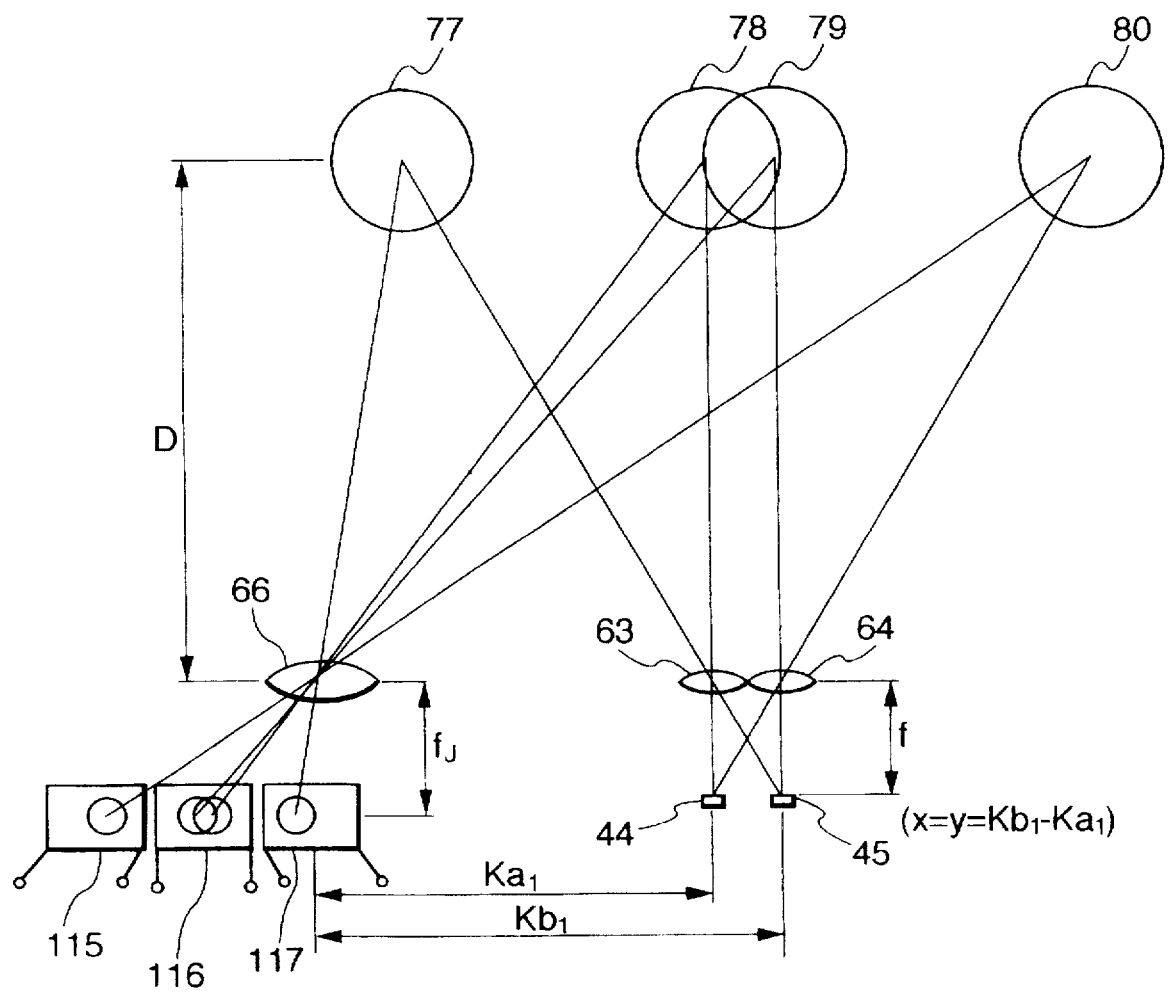
FIG. 9 is a schematic view showing the arrangement of a light projecting/receiving system of a distance measuring apparatus according to the third embodiment of the present invention.

Referring to FIG. 9, an IRED 44 serves as first light emitting means, and an IRED 45 serves as second light emitting means. Light projecting lenses 63 and 64 focus and divide light beams emitted by the light emitting means 44 and 45, and have a focal length f. Projected optical images 77, 78, 79, and 80 are projected from the IREDs 44 and 45 via the light projecting lenses 63 and 64 and are formed at positions separated by a distance D from these lenses. The interval of the lens principal point positions of the light projecting lenses 63 and 64 is kept to be x, and the interval of the centers of the light emitting portions of the IREDs 44 and 45 is kept to be y. The layout of the IREDs and the lenses is determined to satisfy:

$$x = y$$

As shown in FIG. 9, light beams emitted by the two light emitting means (IREDs 44 and 45) are divided into four light beams by the light projecting lenses 63 and 64, and form the projected optical images 78 and 80 based on the light emitted by the IRED 44, and the projected optical images 77 and 79 based on the light emitted by the IRED 45. More specifically, the projected optical images 78 and 79 almost entirely or partially overlap each other within a given finite distance range, and are disposed so that the distance to the same position is measured.

A light-receiving lens 66 focuses light projected onto and reflected by an object to be measured. The lens 66 has a focal length $f_J$, and the intervals (base lengths) between itself and the light projecting lenses 63 and 64 are respectively Ka and Kb. PSDs 115, 116, and 117 receive reflected light beams incident via the light-receiving lens 66 and photoelectrically convert them. The layout of these PSDs is determined so that the PSD 115 receives the reflected light of the projected optical image 80, the PSD 116 receives the reflected light of the projected optical images 78 and 79, and the PSD 117 receives the reflected light of the projected optical image 77.

Figure 10:
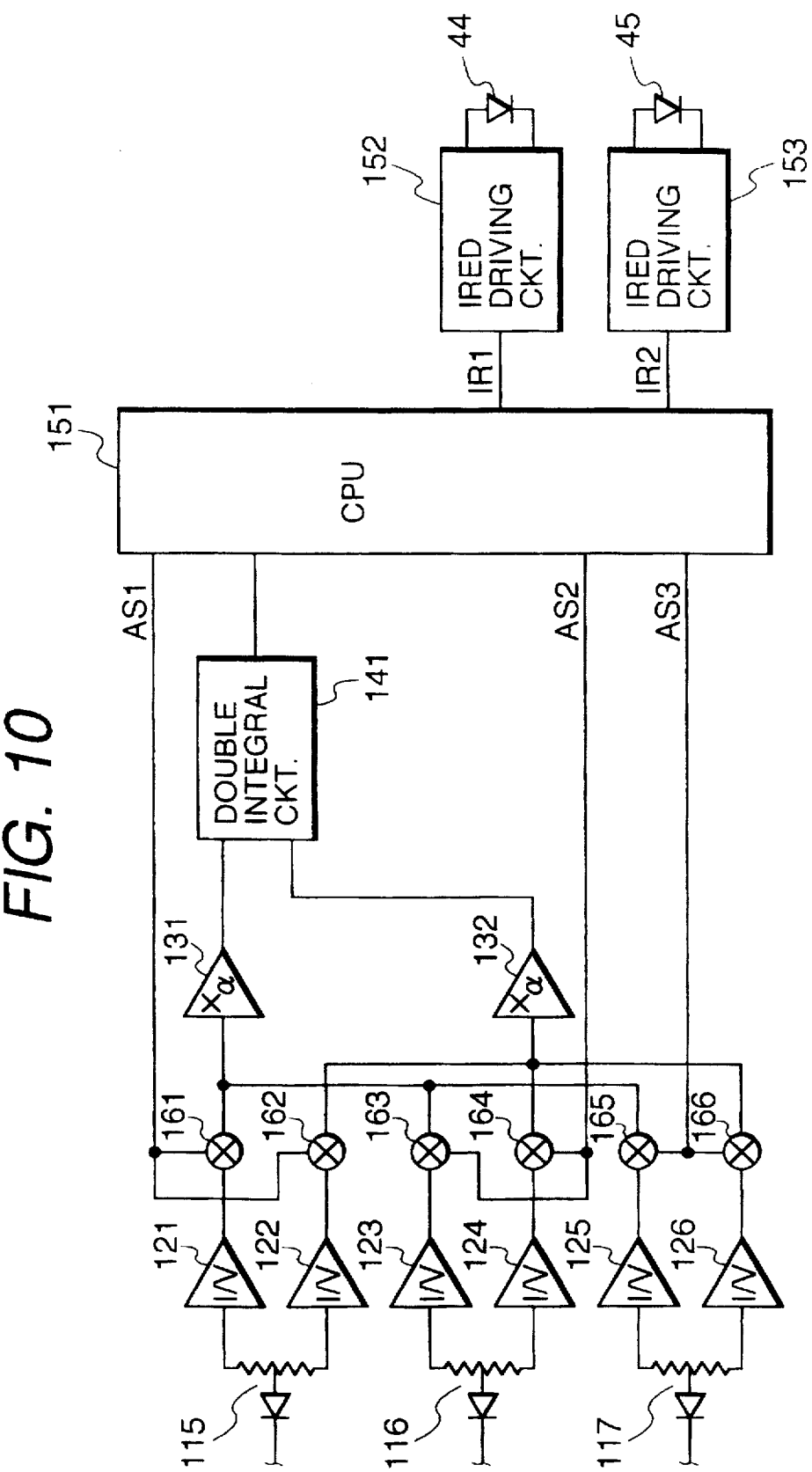
FIG. 10 is a block diagram showing the circuit arrangement of the distance measuring apparatus according to the third embodiment of the present invention.
Figure 11:
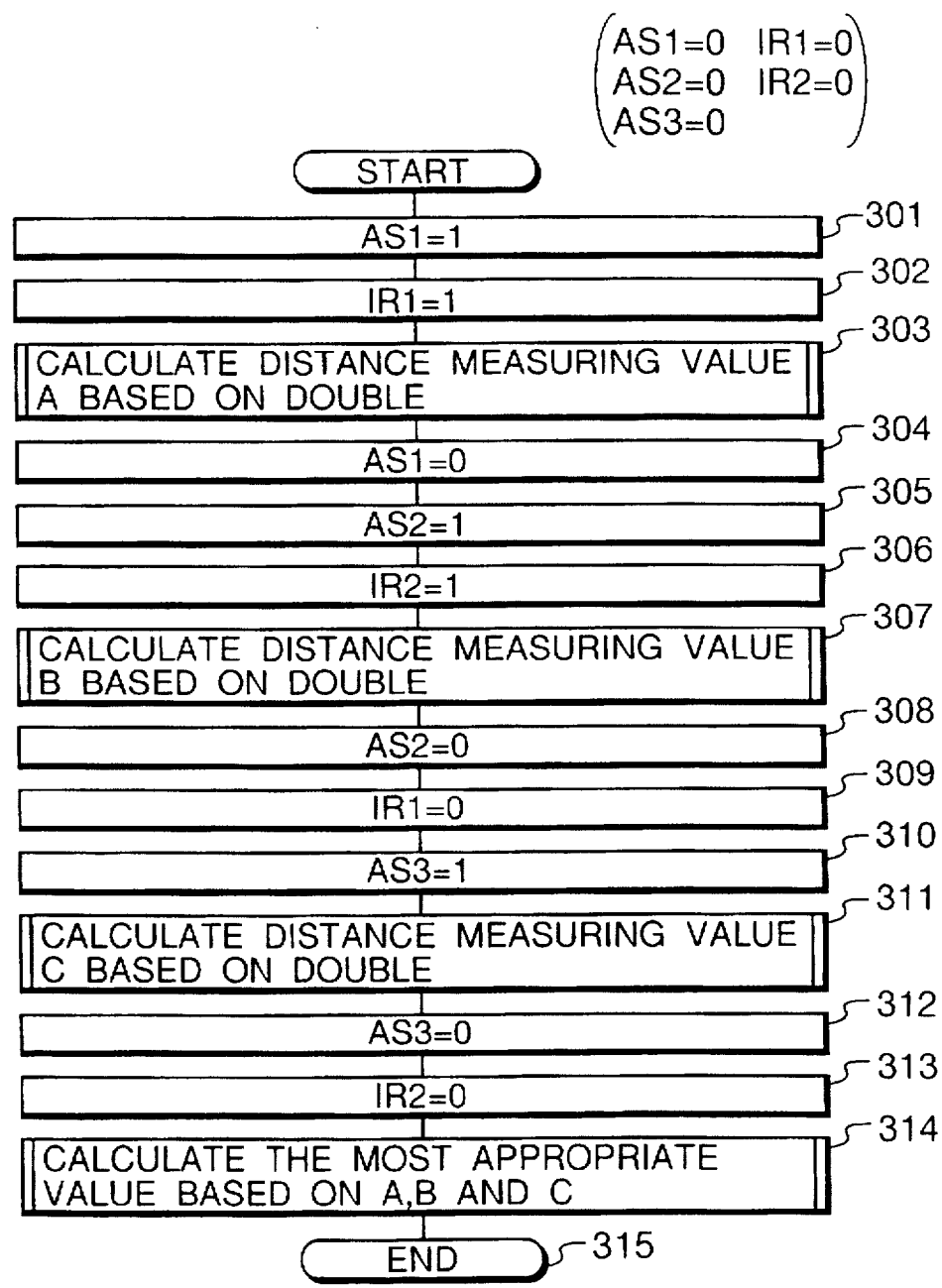
FIG. 11 is a flow chart showing the operation of the distance measuring apparatus shown in FIG. 10.

FIG. 10 is a block diagram showing the circuit arrangement of the multiple points distance measuring apparatus with the arrangement shown in FIG. 9, and the same reference numerals in FIG. 10 denote the same parts as in FIG. 9.

Referring to FIG. 10, amplifiers 121 and 122 convert the output current from the PSD 115 into voltages, amplifiers 123 and 124 convert the output current from the PSD 116 into voltages, and amplifiers 125 and 126 convert the output current from the PSD 117 into voltages. Analog switches 161, 162, 163, 164, 165, and 166 are used for switching the outputs from the amplifiers 121 to 126, and are controlled by control signals AS1, AS2, and AS3 from a CPU 151 (to be described later). Each switch is turned off when the control signal is "0"; the switch is turned on when the control signal is "1". Amplifiers 131 and 132 respectively multiply the outputs from the current-voltage conversion amplifiers 121 to 126 selected by the analog switches 161 to 166 with α.

A calculation circuit 141 calculates distance, and comprises a known double integral circuit for outputting a result proportional to the reciprocal of the distance on the basis of the outputs from the amplifiers 131 and 132. The CPU 151 controls the respective units and calculates distance. IRED driving circuits 152 and 153 respectively drive the IREDs 44 and 45, and are controlled by control signals IR1 and IR2 from the above-mentioned CPU 151. When the outputs from these circuits are "0", the IREDs 44 and 45 are set in the non-projecting state; when the outputs become "1", the IREDs are set in the projecting state.

The distance measuring operation of the multiple points distance measuring apparatus with the above arrangement will be described below with reference to the flow chart of the CPU 151 shown in FIG. 11.

In the initial state, assume that the control signals AS1, AS2, AS3, IR1, and IR2 are set to be "0" (AS1=AS2=AS3=IR1=IR2=0).

In step 301, AS1=1 is set to select the PSD 115. In step 302, IR1=1 is set to drive the IRED 44. In step 303, a distance measurement is performed by a known double integral operation (not shown) using the projected optical image 80, and the distance measuring value obtained by this operation is set in A.

In step 304, AS1=0 is set. In step 305, AS2=1 is set to switch the PSD from the PSD 115 to the PSD 116. In step 306, IR2=1 is set to drive the IRED 45. More specifically, at this time, the IREDs 44 and 45 are driven at the same time. In step 307, a distance measurement is performed by a known double integral operation (not shown) using the projected optical images 78 and 79, and the distance measuring value obtained by this operation is set in B.

In step 308, AS2=0 is set. In step 309, IR1=0 is set to stop the driving operation of the IRED 44. In step 310, AS3=1 is set to select the PSD 117. In step 311, a distance measurement is performed by a known double integral operation (not shown) using the projected optical image 77, and the distance measuring value obtained by this operation is set in C.

In step 312, AS3=0 is set. In step 313, IR2=0 is set to stop the driving operation of the IRED 45. In step 314, the most appropriate value is calculated based on the above-mentioned distance measuring values A, B, and C. In step 315, the series of distance measuring operations end.

According to the third embodiment, upon execution of the distance measurement by the double integral operation in step 307, since the IREDs 44 and 45 are driven at the same time, the distance measuring precision (S/N ratio) at substantially the central portion of the projection points, which is important in, e.g., a camera, of the projected optical images 78 and 79 can be remarkably improved.

In this embodiment, the IREDs 44 and 45 are always driven at the same time in step 307. Alternatively, the IREDs 44 and 45 may be driven at the same time as needed or when they may be driven at the same time, i.e., when the power supply voltage is high; otherwise, only one of the IREDs may be driven.

Figure 12:
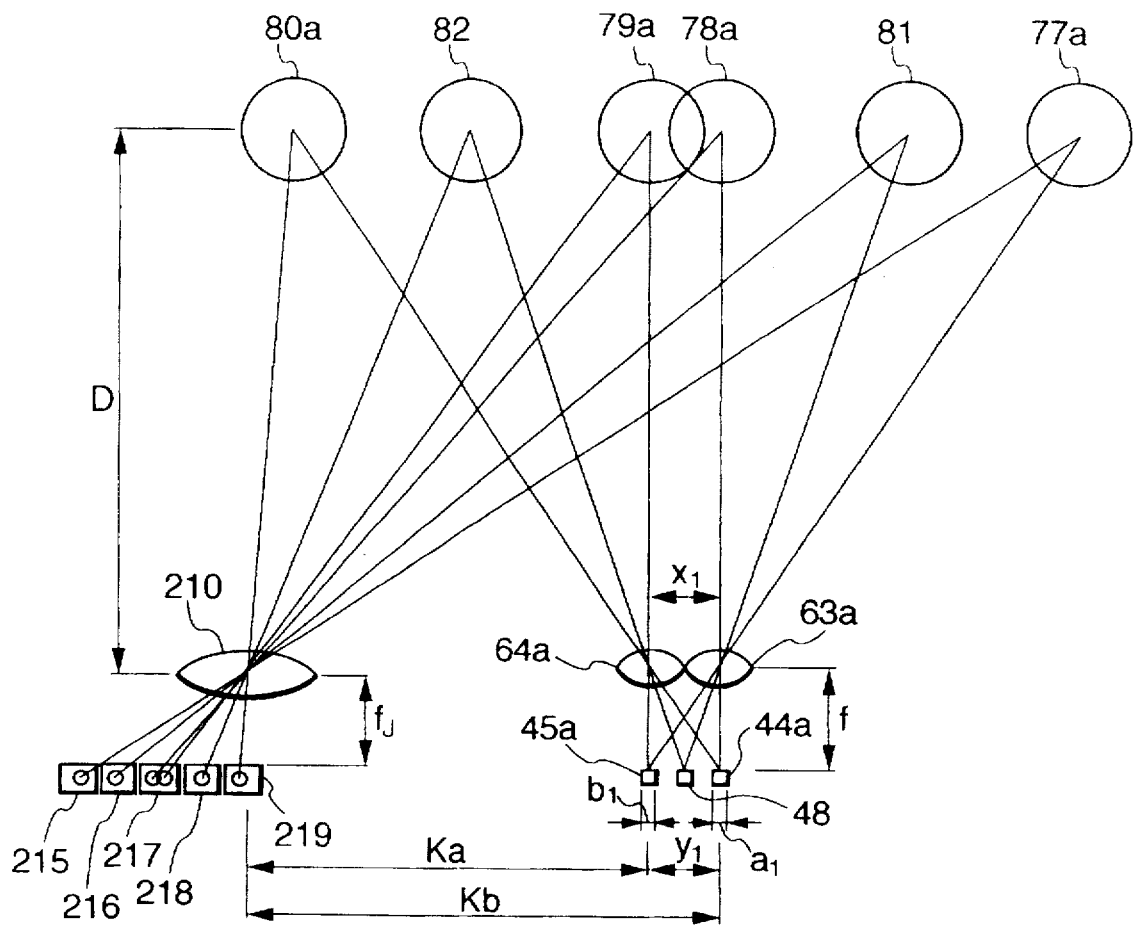
FIG. 12 is a schematic view showing the arrangement of a light projecting/receiving system of a distance measuring apparatus which considers a practical use in the third embodiment of the present invention.

FIG. 12 shows an arrangement which can eliminate light interference described in the prior art upon application of this embodiment to a practical apparatus.

Referring to FIG. 12, an IRED 44a serves as first light emitting means, an IRED 45a serves as second light emitting means, and an IRED 48 serves as third light emitting means. Light projecting lenses 63a and 64a focus and divide light beams from the IREDs 44a, 45a, and 48, and have a focal length f. Projected optical images 77a, 78a, 79a, 80a, 81, and 82 are projected from the IREDs 44a, 45a, and 48 via the light projecting lenses 63a and 64a and are formed at positions separated by a distance D from these lenses. The interval of the lens principal point positions of the light projecting lenses 63a and 64a is kept to be x, and the interval of the centers of the light emitting portions of the IREDs 44a and 45a is kept to be y. The layout of the IREDs and the lenses is determined to satisfy:

$$x=y$$

As shown in FIG. 12, light beams projected from the IREDs 44a, 45a, and 48 as the three light emitting means are divided into six light beams by the light projecting lenses 63a and 64a, and form the projected optical images 78a and 80a based on light emitted by the IRED 44a, the projected optical images 77a and 79a based on light emitted by the IRED 45a, and the projected optical images 81 and 82 based on light emitted by the IRED 48. In this case, the projected optical images 78a and 79a almost entirely or partially overlap each other within a given finite distance range, and are disposed so that the distance to the same position is measured. More specifically, since the projected optical images 78a and 79a form a single projected optical image, and two each projected optical images (79a and 81, and 80a and 82) are formed at the two sides of the central image, multiple (in this case, five) projection points can be formed to have a good balance since the same numbers of projection points are formed at the right and left sides of substantially the central point.

A light-receiving lens 210 focuses light projected onto and reflected by an object to be measured. The lens 210 has a focal length $f_r$, and the intervals (base lengths) between itself and the light projecting lenses 63a and 64a are respectively Ka and Kb. PSDs 215, 216, 217, 218, and 219 serve as light-receiving means for receiving reflected light incident via the light-receiving lens 210 and photoelectrically converting the light. These PSDs have a layout so that the PSD 215 receives the reflected light of the projected optical image 77a, the PSD 216 receives the reflected light of the projected optical image 81, the PSD 217 receives the reflected light of the projected optical images 78a and 79a, the PSD 218 receives the reflected light of the projected optical image 82, and the PSD 219 receives the reflected light of the projected optical image 80a.

Figure 13:
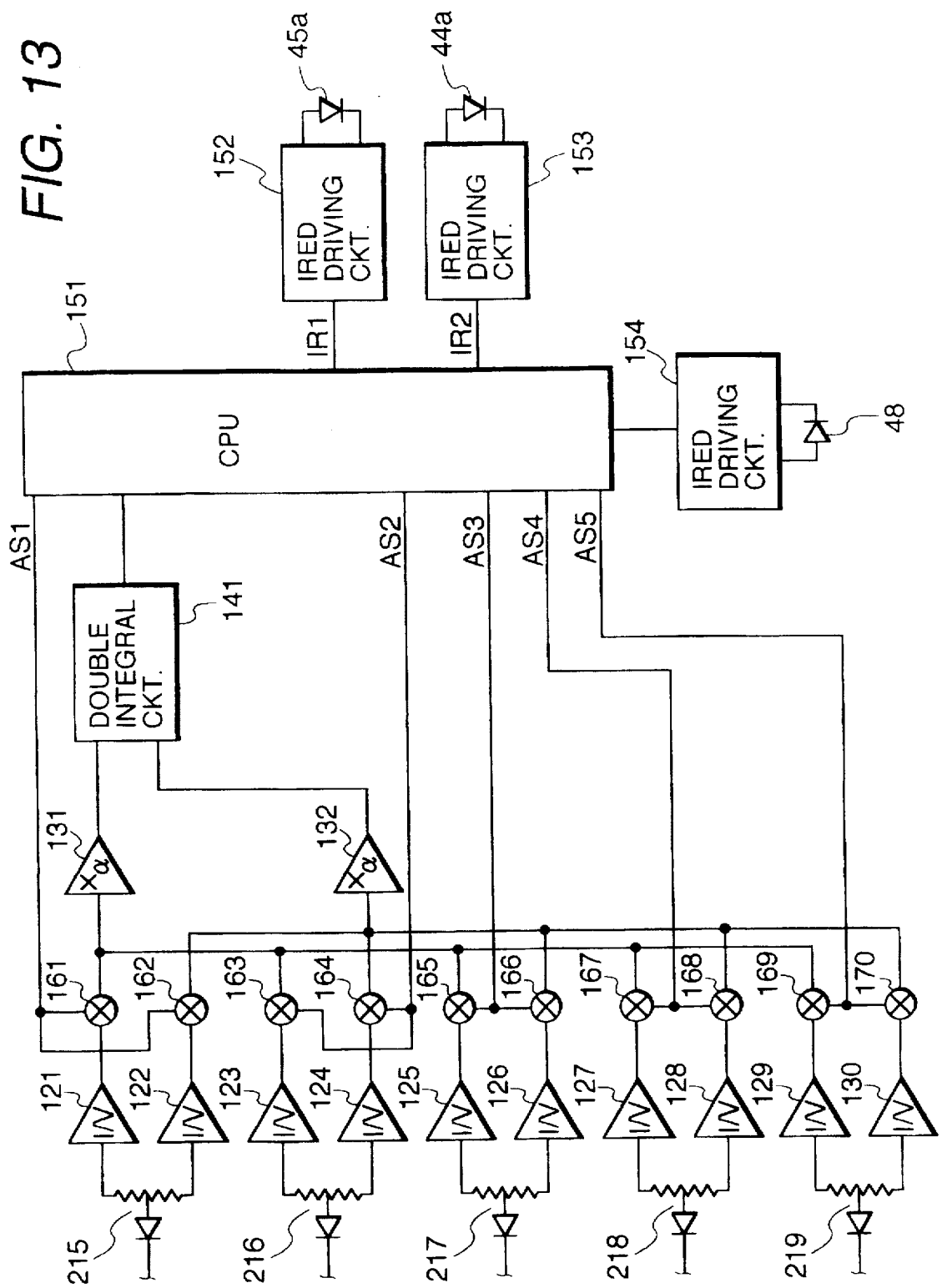
FIG. 13 is a block diagram showing the circuit arrangement of the distance measuring apparatus which considers a practical use in the third embodiment of the present invention.

FIG. 13 is a block diagram showing the circuit arrangement of the multiple points distance measuring apparatus with the above arrangement shown in FIG. 12, and the same reference numerals in FIG. 13 denote the same parts as in FIG. 12.

Referring to FIG. 13, amplifiers 121 and 122 convert the output current from the PSD 215 into voltages, amplifiers 123 and 124 convert the output current from the PSD 216 into voltages, amplifiers 125 and 126 convert the output current from the PSD 217 into voltages, amplifiers 127 and 128 convert the output current from the PSD 218 into voltages, and amplifiers 129 and 130 convert the output current from the PSD 219 into voltages. Analog switches 161, 162, 163, 164, 165, 166, 167, 168, 169, and 170 are used for switching the outputs from the amplifiers 121 to 130, and are controlled by control signals AS1, AS2, AS3, AS4, and AS5 from a CPU 151 (to be described later). Each switch is turned off when the control signal is "0"; the switch is turned on when the control signal is "1". Amplifiers 131 and 132 respectively multiply the outputs from the current-voltage conversion amplifiers 121 to 130 selected by the analog switches 161 to 170 with α.

A calculation circuit 141 calculates distance, and comprises a known double integral circuit for outputting a result proportional to the reciprocal of the distance on the basis of the outputs from the amplifiers 131 and 132. The CPU 151 controls the respective units, and calculates distance. IRED driving circuits 152, 153, and 154 respectively drive the IREDs 44a, 45a, and 48, and are controlled by control signals IR1, IR2, and IR3 from the above-mentioned CPU 151. When the output from the circuit is "0", each of the IREDs 44a, 45a, and 48 is set in the non-projecting state; when the output is "1", the IRED is set in the projecting state.

The distance measuring operation of the above multiple points distance measuring apparatus will be described below with reference to the flow chart shown in FIG. 14.

In the initial state, assume that the control signals AS1, AS2, AS3, AS4, AS5, IR1, IR2, and IR3 are respectively set to be "0" (AS1=AS2=AS3=AS4=AS5=IR1=IR2=IR3=0).

In step 301, AS1=1 is set to select the PSD 215. In step 302, IR1=1 is set to drive the IRED 45a. In step 303, a distance measurement is performed by a known double integral operation (not shown) using the projected optical image 77a, and the distance measuring value obtained by this operation is set in A.

In step 304, AS1=0 is set. In step 305, AS3=1 is set to switch the PSD from the PSD 215 to the PSD 217. Subsequently, in step 306, IR2=1 is set to drive the IRED 44a. More specifically, at this time, the IREDs 44a and 45a are driven at the same time. In step 307, a distance measurement is performed by a known double integral operation (not shown) using the projected optical images 78a and 79a, and the distance measuring value obtained by this operation is set in C.

In step 308, AS3=0 is set. In step 309, IR1=0 is set to stop the driving operation of the IRED 45a. In step 310, AS5=1 is set to select the IRED 219. In step 311, a distance measurement is performed by a known double integral operation (not shown) using the projected optical image 80a, and the distance measuring value obtained by this operation is set in E.

In step 312, AS5=0 is set. In step 313, IR2=0 is set to stop the driving operation of the IRED 44a. In step 314, AS2=1 is set to select the PSD 216. In step 315, IR3=1 is set to drive the IRED 48. In step 316, a distance measurement is performed by a known double integral operation (not shown) using the projected optical image 81, and the distance measuring value obtained by this operation is set in B.

In step 317, AS2=0 is set. In step 318, AS4=1 is set to switch the PSD to the PSD 218. In step 319, a distance measurement is performed by a known double integral operation (not shown) using the projected optical image 82, and the distance measuring value obtained by this operation is set in D.

In step 320, AS4=0 is set. In step 321, IR3=0 is set to stop the driving operation of the IRED 48. In step 322, the most appropriate value is calculated based on the above-mentioned distance measuring values A, B, C, D, and E. In step 323, the series of distance measuring operations end.

According to the third embodiment, upon execution of the distance measurement by the double integral operation in step 307, since the IREDs 44a and 45a are driven at the same time, the distance measuring precision (S/N ratio) using the projected optical images 78a and 79a can be remarkably improved.

In this embodiment, the IREDs 44a and 45a are always driven at the same time in step 307. Alternatively, the IREDs 44a and 45a may be driven at the same time as needed or when they may be driven at the same time, i.e., when the power supply voltage is high; otherwise, only one of the IREDs may be driven.

Since the projected optical images from a single light emitting means (in this embodiment, the projected optical images 78a and 80a of the IRED 44a, the projected optical images 77a and 79a of the IRED 45a, and the projected optical images 81 and 82 of the IRED 48) are not formed adjacent to each other unlike in the prior art, a multiple points distance measuring apparatus free from light interference can be provided.

Furthermore, since the projected optical images 78a and 79a form a single projected optical image, and two each projected optical images (79a and 81, and 80a and 82) are formed at the two sides of the central image, multiple (in this case, five) projection points are formed to have a good balance since the same numbers of projection points are formed at the right and left sides of substantially the central point.

Figure 15:
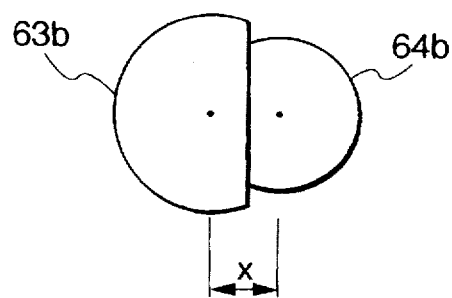
FIG. 15 is a view showing another example of the light projecting system shown in FIG. 12.

FIG. 15 shows a modification of this embodiment. In FIG. 15, light projecting lenses 63a and 64a focus and divide light beams from the light emitting means (IREDs 44a, 45a, and 48), and have different effective aperture sizes. Such an arrangement is effective when the size of one of the light projecting lenses must be decreased due to a limitation on the space of the apparatus. In this case, the energy of light projected by the light projecting lens 64a slightly lowers, but the S/N ratio is expected to improve in practice at substantially the central portion, as compared to the conventional apparatus.

Figure 16:
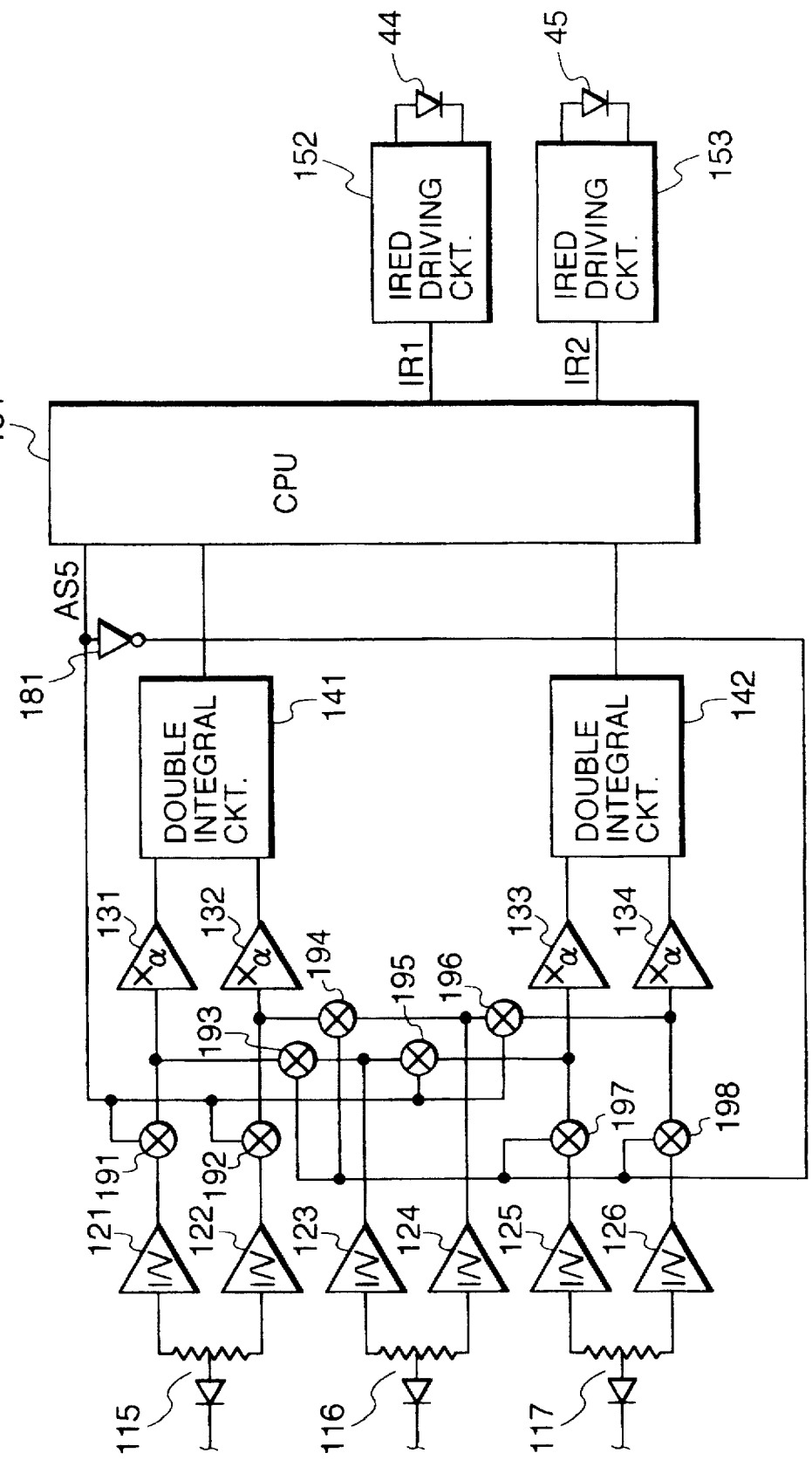
FIG. 16 is a block diagram showing the circuit arrangement of a distance measuring apparatus according to the fourth embodiment of the present invention.
Figure 17:
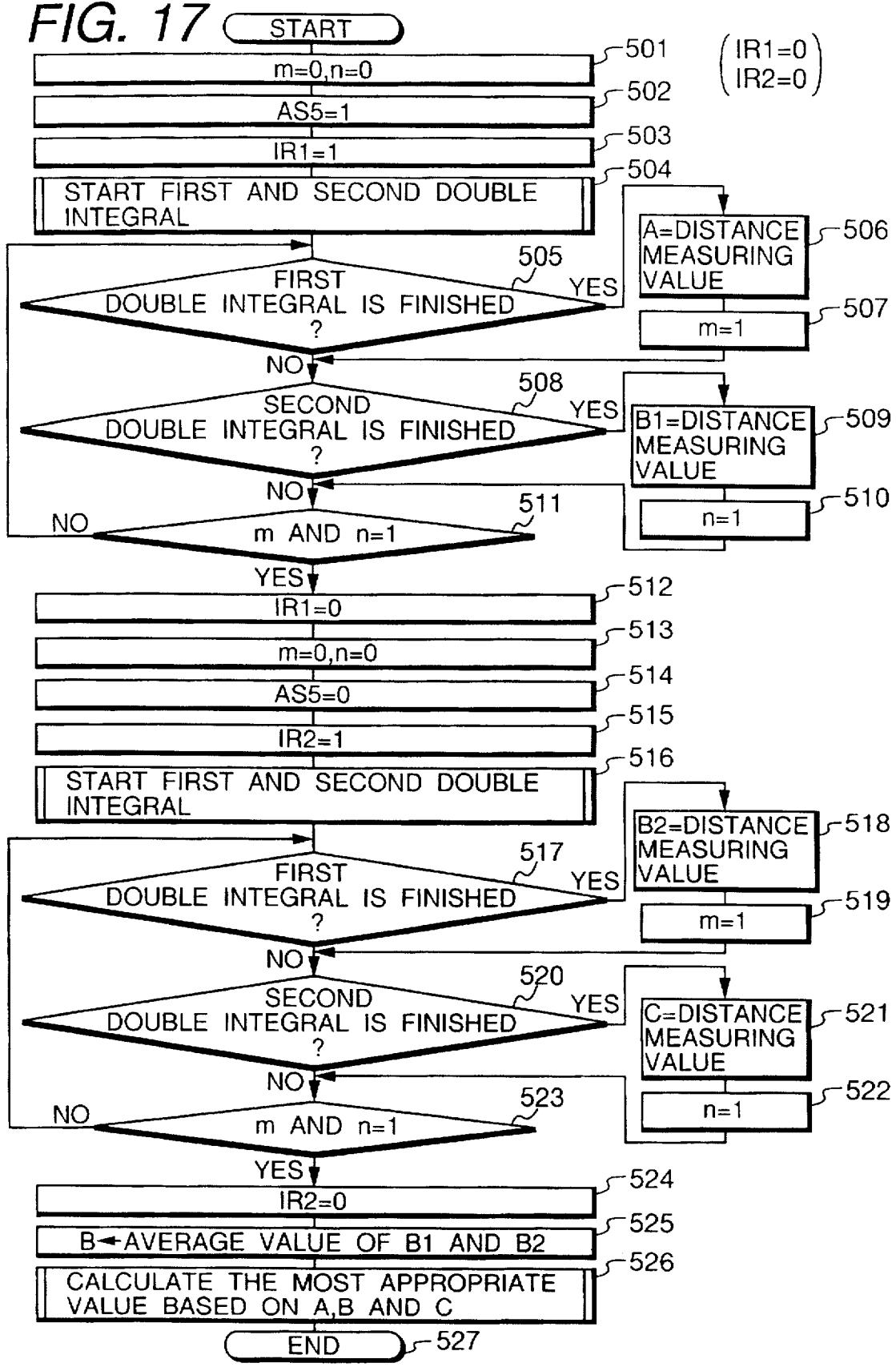
FIG. 17 is a flow chart showing the operation of the distance measuring apparatus shown in FIG. 16.
Figure 18:
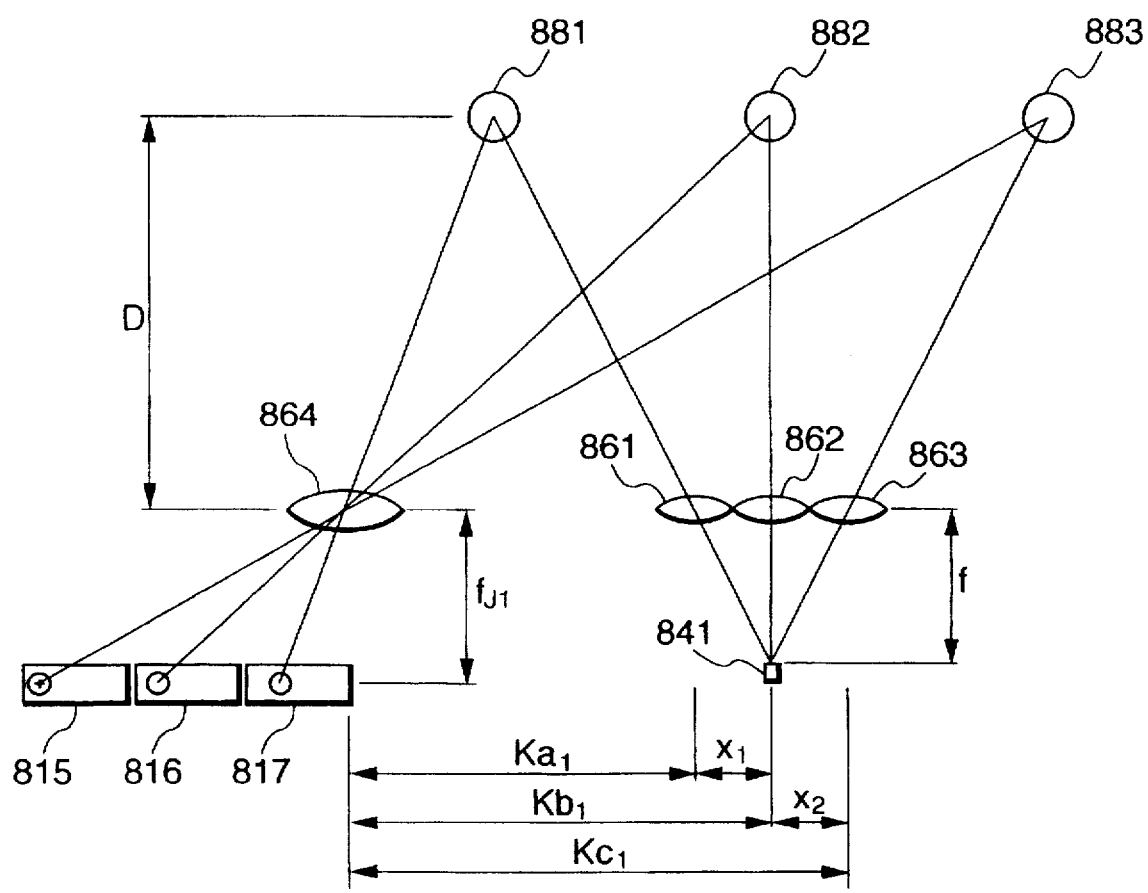
FIG. 18 is a schematic view showing the arrangement of a conventional distance measuring apparatus.
Figure 19:
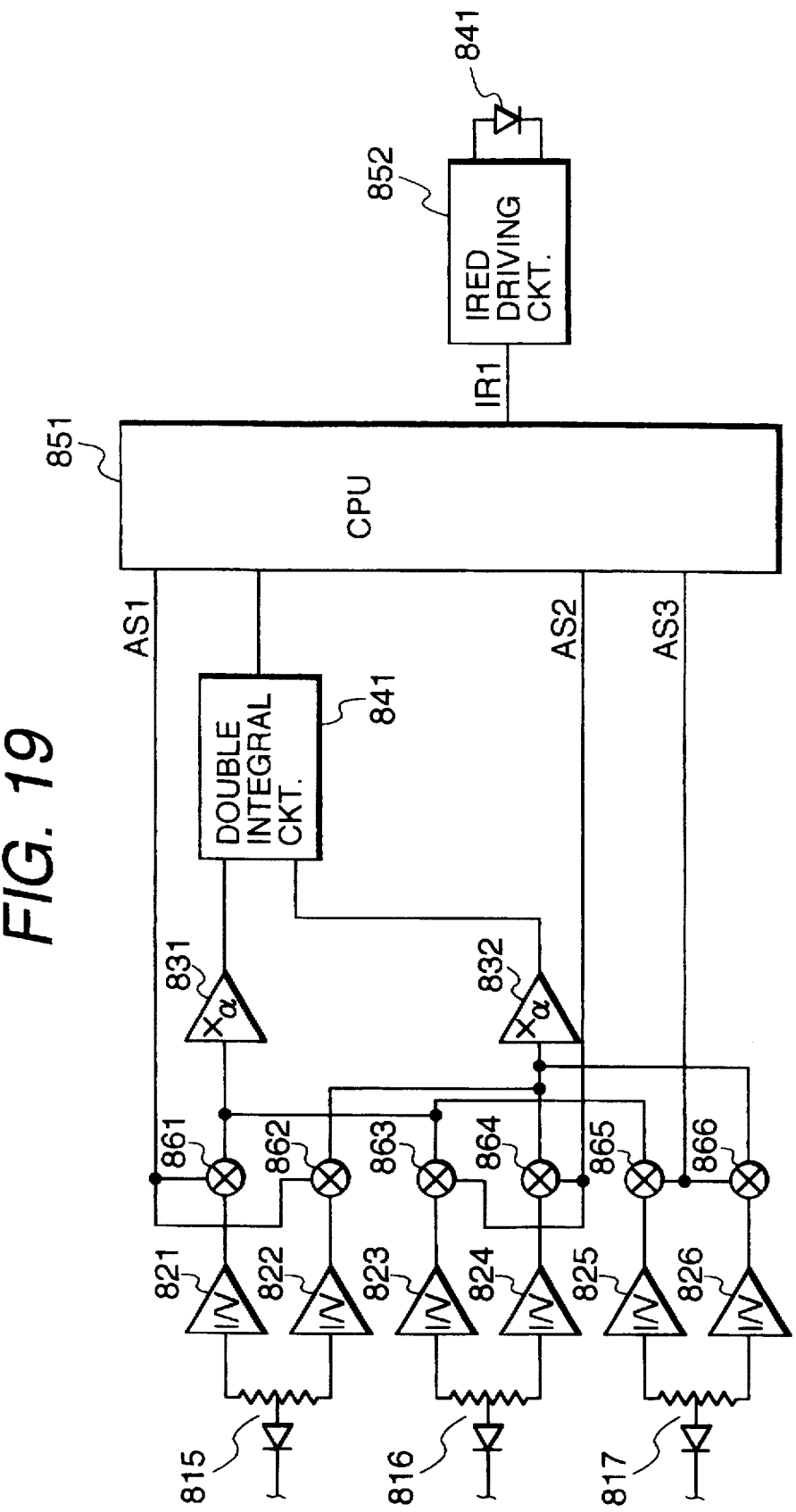
FIG. 19 is a block diagram showing the circuit arrangement of the conventional distance measuring apparatus.
Figure 20:
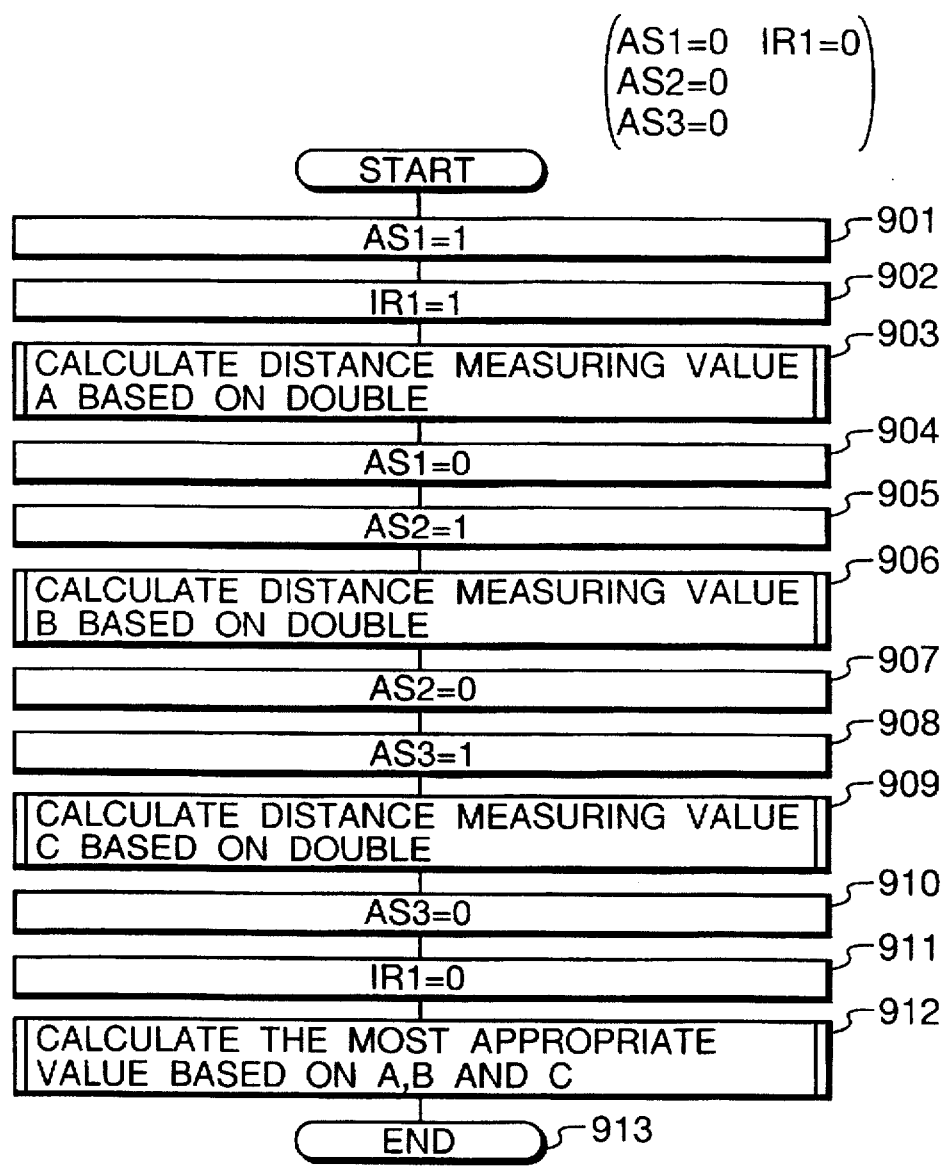
FIG. 20 is a flow chart showing the operation of the distance measuring apparatus shown in FIG. 19.

FIGS. 16 and 17 show the fourth embodiment of the present invention. The light projecting/receiving system of the multiple points distance measuring apparatus of this embodiment is assumed to be the same as that in the third embodiment (see FIG. 9) to explain the features unique to this embodiment, and a detailed description and illustration thereof will be omitted.

FIG. 16 is a block diagram showing the circuit arrangement of the multiple points distance measuring apparatus according to the fourth embodiment of the present invention, and the same reference numerals in FIG. 16 denote the same parts as in FIG. 9.

Referring to FIG. 16, amplifiers 121 and 122 convert the output current from a PSD 115 into voltages, amplifiers 123 and 124 convert the output current from a PSD 116 into voltages, and amplifiers 125 and 126 convert the output current from a PSD 117 into voltages. Analog switches 191, 192, 193, 194, 195, 196, 197, and 198 are used for switching the outputs from the amplifiers 121 to 126, and are controlled by a control signal AS5 from a CPU 151 (to be described later). When the signal input to each of the analog switches 191 to 198 is "0", the switch is turned off; when the signal is "1", the switch is turned on.

Amplifiers 131, 132, 133, and 134 respectively multiply the outputs from the current-voltage conversion amplifiers 121 to 126 selected by the analog switches 191 to 198 with α. A calculation circuit 141 calculates distance, and comprises as a known double integral circuit, serving as a first double integral circuit, for outputting a result proportional to the reciprocal of the distance on the basis of the outputs from the amplifiers 131 and 132. Also, a known double integral circuit 142 serves as a second double integral circuit, and outputs a result proportional to the reciprocal of the distance on the basis of the outputs from the amplifiers 133 and 134. The CPU 151 controls the respective units, and calculates distance. An inverter 181 inverts the control signal AS5 from the CPU 151. IRED driving circuits 152 and 153 are used for driving the IREDs 44 and 45, and are controlled by control signals IR1 and IR2 from the above-mentioned CPU 151. When the output from the circuit is "0", each IRED is set in the non-projecting state; when the output is "1", the IRED is set in the projecting state.

The distance measuring operation of the multiple points distance measuring apparatus with the above arrangement will be described below with reference to the flow chart shown in FIG. 17.

In the initial state, assume that the control signals IR1 and IR2 from the CPU 151 are respectively "0" (IR1=IR2=0).

In step 501, first and second double integral latches m and n serving as discrimination latches (to be described later) are respectively set to be "0". In step 502, AS5=1 is set, so that the signal from the PSD 115 is input to the first double integral circuit 141 via the amplifiers 131 and 132, and the signal from the PSD 116 is input to the second double integral circuit 142 via the amplifiers 133 and 134.

In step 503, IR1=1 is set to drive the IRED 44. In step 504, the double integral operations by the first and second double integral circuits 141 and 142 are started simultaneously. In step 505, it is checked if the first double integral operation (i.e., the distance measurement based on a projected optical image 80) is finished. If NO in step 505, the flow advances to step 508. On the other hand, if YES in step 505, the flow advances to step 506, and the distance measuring value obtained by the first double integral operation is set in A. Subsequently, in step 507, the first double integral finish latch m is set to be "1", and thereafter, the flow advances to step 508.

In step 508, it is checked if the second double integral operation (i.e., the distance measurement based on a projected optical image 78 at substantially the center) is finished. If NO in step 508, the flow advances to step 511. On the other hand, if YES in step 508, the flow advances to step 509, and the distance measuring value obtained by the second double integral operation is set in B1. Subsequently, in step 510, the second double integral finish latch n is set to be "1", and thereafter, the flow advances to step 511.

It is then checked in step 511 if both the first and second double integral operations are finished. If NO in step 511, the flow returns to step 505, and the operations in steps 505 to 511 are repeated. On the other hand, if YES in step 511, the flow advances to step 512, and IR1=0 is set to stop the driving operation of the IRED 44.

In step 513, the latches m and n serving as discrimination latches are respectively set to be "0". In step 514, AS5=0 is set, so that the signal from the PSD 116 is input to the first double integral circuit 141 via the amplifiers 131 and 132, and the signal from the PSD 117 is input to the second double integral circuit 142 via the amplifiers 133 and 134.

In step 515, IR2=1 is set to drive the IRED 45. Subsequently, in step 516, the double integral operations of the first and second double integral circuits 141 and 142 are simultaneously started. In step 517, it is checked if the first double integral operation (i.e., the distance measurement based on a projected optical image 79 at substantially the center) is finished. If NO in step 517, the flow advances to step 520. On the other hand, if YES in step 517, the flow advances to step 518, and the distance measuring value obtained by the first double integral operation is set in B2. In step 519, the first double integral finish latch m is set to be "1", and the flow advances to step 520.

In step 520, it is checked if the second double integral operation (i.e., the distance measurement based on a projected optical image 77) is finished. If NO in step 520, the flow advances to step 523. If YES in step 520, the flow advances to step 521, and the distance measuring value obtained by the second double integral operation is set in C. Subsequently, in step 522, the second double integral finish latch n is set to be "1", and the flow then advances to step 523. In step 523, it is checked if both the first and second double integral operations are finished. If NO in step 523, the flow returns to step 517, and the operations in steps 517 to 523 are repeated. On the other hand, if YES in step 523, the flow advances to step 524, and IR2=0 is set to stop the driving operation of the IRED 45. In step 525, the average value of the distance measuring values B1 and B2 at substantially the central portion is set in B. Subsequently, in step 526, the most appropriate value is calculated based on the above-mentioned distance measuring values A, B, and C. In step 527, the series of distance measuring operations end.

According to the fourth embodiment, since reflected light beams of light which is projected from a single light emitting means and is divided into a plurality of beams are received by different light-receiving means, and distances are independently and simultaneously calculated by a plurality of calculation circuits, the distance measuring time can be remarkably shortened although multiple points distance measuring operations are performed.

Furthermore, according to the fourth embodiment, since the projected optical images 78 and 79 (see FIG. 9) roughly overlap each other in a given finite distance range, and allow a distance measurement at a single point, the distance measurement at the single point is consequently performed twice in steps 504 to 511 and in steps 516 to 523 in FIG. 17, and the average value of these distance measuring results is set in the distance measuring value, thereby improving the S/N ratio at substantially the central portion of the projection points, which are important in, e.g., a camera, in practice.

Note that either steps 504 to 511 or steps 516 to 523 may be omitted (in this case, step 525 is omitted), and the distance measurement may be performed only once.

Upon application of this embodiment to a practical apparatus, in order to eliminate light interference described in the prior art, the arrangement shown in FIG. 12 is preferably adopted to perform the above-mentioned operation.

Note that the present invention can also be applied to an apparatus which projects optical patterns in a plurality of target directions, and obtains defocus information in the plurality of target directions on the basis of the reflected light of the patterns.

Furthermore, while the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

Also, the individual components shown in schematic or block form in the Drawings are all well-known in the camera arts and their specific construction and operation are not critical to the operation or best mode for carrying out the invention.

In the present invention, the respective embodiments and their technical elements may be combined as needed.

In the present invention, the entire arrangement or a portion thereof of claims or the embodiments may form a single apparatus, may be combined with other apparatuses, or may be an element constituting an apparatus.

The present invention may be applied to various types of cameras such as a single-lens reflex camera, a lens shutter camera, a video camera, and the like, an optical or non-optical equipment other than the camera, a device applied to these cameras and optical and non-optical equipments, and an element constituting them.

What is claimed is:

1. An apparatus for obtaining information associated with distances in a plurality of target directions by projecting light in the plurality of target directions and receiving reflected light, comprising:

a first light emitting portion;

a second light emitting portion;

a division light projecting device for division-projecting light emitted by said first light emitting portion in at least first and second target directions, and division-projecting light emitted by said second light emitting portion in at least the second target direction and a third target direction;

a first light receiving portion for receiving reflected light of the division-projecting light in the first target direction from said first light emitting portion; and a second light receiving portion for receiving reflected light of the division-projecting light in the second target direction from said first light emitting portion.

2. An apparatus according to claim 1, wherein said division light projecting device comprises a lens unit having a plurality of optical axes.

3. An apparatus according to claim 2, a layout of said first and second light emitting portions and the two portions of said lens unit being determined to satisfy a condition:

$$y \geq x-(a+b)/2,$$

where y is an interval between centers of said first and second light emitting portions, x is an interval between lens principal point positions of said first and second light emitting portions, and a and b are sizes, in an alignment direction, of said first and second light emitting portions.

4. An apparatus according to claim 1, wherein said division light projecting device comprises a plurality of lens units.

5. An apparatus according to claim 4, a layout of said first and second light emitting portions and the two lens units being determined to satisfy a condition:

$$y \geq x-(a+b)/2,$$

where y is an interval between centers of said first and second light emitting portions, x is an interval between lens principal point positions of said first and second light emitting portions, and a and b are sizes, in an alignment direction, of said first and second light emitting portions.

6. An apparatus according to claim 1, further comprising:
a control device for obtaining information associated with a distance in at least the second target direction by controlling said first and second light emitting portions to emit light in an identical time range.

7. An apparatus according to claim 1, further comprising:
a control device for obtaining information associated with a distance in at least the second target direction twice by controlling said first and second light emitting portions to emit light in different time ranges.

8. An apparatus according to claim 1, further comprising:
a control device for obtaining information associated with a distance in at least the second target direction upon light emission of one of said first and second light emitting portions by controlling said first and second light emitting portions to emit light in different time ranges.

9. An apparatus according to claim 1, wherein said apparatus comprises a camera.

10. An apparatus according to claim 1, wherein said apparatus comprises an optical apparatus.

11. An apparatus for obtaining information associated with distances in a plurality of target directions by projecting light in the plurality of target directions and receiving reflected light, comprising:

(A) a first light emitting portion;

(B) a second light emitting portion; and (C) a division light projecting device for division-projecting light emitted by said first light emitting portion in at least first and second target directions, and division-projecting light emitted by said second light emitting portion in at least a third target direction between the first and second target directions and a fourth target direction outside the first and second target directions.

12. An apparatus according to claim 11, wherein said division light projecting device comprises a lens unit having a plurality of optical axes.

13. An apparatus according to claim 11, wherein said division light projecting device comprises a plurality of lens units.

14. An apparatus according to claim 11, further comprising:
a control device for controlling said first and second light emitting portions to emit light in different time ranges.

15. An apparatus according to claim 11, wherein said apparatus comprises a camera.

16. An apparatus according to claim 11, wherein said apparatus comprises an optical apparatus.

17. An apparatus for obtaining information associated with distances in a plurality of target directions by projecting light in the plurality of target directions and receiving reflected light, comprising:

a first light emitting portion;

a second light emitting portion;

a division light projecting device for division-projecting light emitted by said first light emitting portion in at least first and second target directions, and projecting light emitted by said second light emitting portion in at least the second target direction;

a first light receiving portion for receiving reflected light of the division-projecting light in the first target direction from said first light emitting portion; and a second light receiving portion for receiving reflected light of the division-projecting light in the second target direction from said first light emitting portion.

18. An apparatus according to claim 17, wherein said division light projecting device comprises a lens unit having a plurality of optical axes.

19. An apparatus according to claim 17, wherein said division light projecting device comprises a plurality of lens units.

20. An apparatus according to claim 17, further comprising:
a control device for obtaining information associated with a distance in at least the second target direction by controlling said first and second light emitting portions to emit light in an identical time range.

21. An apparatus according to claim 17, further comprising:
a control device for obtaining information associated with distances in at least the second target direction twice by controlling said first and second light emitting portions to emit light in different time ranges.

22. An apparatus according to claim 17, further comprising:
a control device for obtaining information associated with a distance in at least the second target direction upon light emission of one of said first and second light emitting portions by controlling said first and second light emitting portions to emit light in different time ranges.

23. An apparatus according to claim 17, wherein said apparatus comprises a camera.

24. An apparatus according to claim 17, wherein said apparatus comprises an optical apparatus.

25. An apparatus for obtaining information associated with distances in a plurality of target directions by projecting light in the plurality of target directions and receiving reflected light, comprising:

(A) a first light emitting portion;

(B) a second light emitting portion; and (C) a division light projecting device for division-projecting light emitted by said first light emitting portion in at least first and second target directions, and projecting light emitted by said second light emitting portion in at least a direction between the first and second target directions.

26. An apparatus according to claim 25, wherein said division light projecting device comprises a lens unit having a plurality of optical axes.

27. An apparatus according to claim 25, wherein said division light projecting device comprises a plurality of lens units.

28. An apparatus according to claim 25, further comprising:

a control device for controlling said first and second light emitting portions to emit light in different time ranges.

29. An apparatus according to claim 25, wherein said apparatus comprises a camera.

30. An apparatus according to claim 25, wherein said apparatus comprises an optical apparatus.

* * * * *

UNITED STATES PATENT AND TRADEMARK OFFICE
CERTIFICATE OF CORRECTION

PATENT NO. : 5,760,883

DATED : June 2, 1998

INVENTOR(S) : Ohkado

It is certified that error appears in the above-identified patent and that said Letters Patent is hereby corrected as shown below:

COLUMN 3:

Line 28, "the-number" should read --the number--.

Signed and Sealed this

Twenty-second Day of June, 1999

Attest:

Q. TODD DICKINSON

Attesting Officer

Acting Commissioner of Patents and Trademarks